(12) United States Patent
Borne-Pons et al.

(10) Patent No.: US 10,951,420 B2
(45) Date of Patent: *Mar. 16, 2021

(54) CRYPTOLOGIC BLOCKCHAIN INTEROPERATION

(71) Applicant: Accenture Global Solutions Limited, Dublin (IE)

(72) Inventors: Hugo Borne-Pons, Juan-les-Pins (FR); Giuseppe Giordano, Juan-les-Pins (FR); Luca Schiatti, Juan-les-Pins (FR); Naima Hamouma, Lyons (FR)

(73) Assignee: Accenture Global Solutions Limited, Dublin (IE)

( * ) Notice: Subject to any disclaimer, the term of this patent is extended or adjusted under 35 U.S.C. 154(b) by 216 days.

This patent is subject to a terminal disclaimer.

(21) Appl. No.: 16/276,264

(22) Filed: Feb. 14, 2019

(65) Prior Publication Data

US 2020/0076617 A1    Mar. 5, 2020

Related U.S. Application Data

(63) Continuation of application No. 16/116,360, filed on Aug. 29, 2018, now Pat. No. 10,250,395.

(51) Int. Cl.
*H04L 9/32* (2006.01)
*H04L 9/14* (2006.01)
*H04L 9/08* (2006.01)

(52) U.S. Cl.
CPC .......... *H04L 9/3255* (2013.01); *H04L 9/0841* (2013.01); *H04L 9/0894* (2013.01);
(Continued)

(58) Field of Classification Search
CPC . H04L 9/3255; H04L 9/3247; H04L 2209/38; H04L 9/3213
See application file for complete search history.

(56) References Cited

U.S. PATENT DOCUMENTS

2016/0260169 A1* 9/2016 Arnold ................... G06Q 40/12
2016/0330034 A1 11/2016 Back et al.
(Continued)

OTHER PUBLICATIONS

Extended European Search Report, dated Jan. 9, 2020, pp. 1-11, issued in European Patent Application No. 19191957.0, European Paetnt Office, Munich, Germany.
(Continued)

*Primary Examiner* — Ali S Abyaneh
(74) *Attorney, Agent, or Firm* — Brinks Gilson & Lione

(57) ABSTRACT

A distributed ledger technology (DLT) network may include a plurality of participant nodes. The participant nodes may respectively validate a distributed ledger based on a consensus protocol. A blockchain export system may send, to a data receiver not included in the DLT network, a participant public key for a participant node of the DLT network. The blockchain export system may receive, from the data receiver, a request to share token data stored in a blockchain of the distributed ledger. The blockchain export system may generate a certification that the token data is stored on the blockchain. The certification may include a digital signature based on a participant private key paired to the participant public key. The blockchain system may transmit the certification to the data receiver. The data receiver may verify the certification based on the participant public key.

20 Claims, 13 Drawing Sheets

FIG. 1

(52) U.S. Cl.
    CPC .............. *H04L 9/14* (2013.01); *H04L 9/3239*
        (2013.01); *H04L 9/3247* (2013.01); *H04L*
        *2209/38* (2013.01); *H04L 2209/56* (2013.01)

(56) References Cited

U.S. PATENT DOCUMENTS

| | | | |
|---|---|---|---|
| 2017/0155515 | A1 | 6/2017 | Androulaki et al. |
| 2017/0243193 | A1 | 8/2017 | Manian et al. |
| 2017/0300978 | A1 | 10/2017 | Narasimhan et al. |
| 2017/0372300 | A1 | 12/2017 | Dunlevy et al. |
| 2018/0019879 | A1* | 1/2018 | Kravitz ................. H04L 9/3236 |
| 2018/0088928 | A1 | 3/2018 | Smith et al. |
| 2018/0097635 | A1* | 4/2018 | Moses ................. H04L 63/0442 |
| 2018/0165476 | A1 | 6/2018 | Carey et al. |
| 2018/0204213 | A1* | 7/2018 | Zappier ................... H04L 63/10 |
| 2018/0264347 | A1 | 9/2018 | Tran et al. |
| 2018/0285996 | A1 | 10/2018 | Ma |
| 2018/0314809 | A1* | 11/2018 | Mintz ................... H04L 9/3236 |

OTHER PUBLICATIONS

Hardjono, T., et al., "Towards a Design Philosophy for Interoperable Blockchain Systems," dated May 16, 2018, pp. 1-27, arxiv.org, Cornell University Library, Cornell University, Ithaca, NY XP080878605.

Kravchenko, P., et al., "Distributed multi-ledger and asset exchange model for the financial industry," dated Jan. 9, 2017, pp. 1-14, XP055595124, available at URL: https://distributedlab.com/whitepaper/DLT&exchanqeModel.pdf.

Buterin, Vitalik, "Chain Interoperability," dated Sep. 9, 2016, pp. 1-25, XP055561466, available at URL: https://staticl.squarespace.com/static/55f73743e4b051cfcc0b02cf/t/5886800ecd0f68de3033496bl/1485209617040/Chain%20Interoperability.pdf.

Dr. Gavin Wood, "Polkadot: Vision fora Heterogeneous Multi-Chain Framework," dated Dec. 8, 2016, pp. 1-21, Draft 1, published online by PolkaDot Network at URL https://polkadot.network/PolkaDotPaper.pdf.

Extended European Search Report, dated Jan. 23, 2020, pp. 1-5, issued in European Patent Application No. 19192511.4, European Patent Office, Munich, Germany.

Luo, Kan et al., "A Multiple Blockchains Architecture on Inter-Blockchain Communication," dated Jul. 16, 2018, pp. 139-145, 2018 IEEE International Conference on Software Quality, Reliability and Security Companion, (QRS-C), Jul. 16-20, 2018, Lisbon, Portugal. XP033383707.

Back, Adam, et al., "Enabling Blockchain Innovations with Pegged Sidechains," dated Oct. 22, 2014, pp. 1-25, XP055392256, URL: https://blockstream.com/sidechains.

"Interledger Architecture," Interledger, Retrieved from Internet on Aug. 27, 2018, pp. 1-8, published online by Interledger Team at URL: https://interledger.org/rfcs/0001-interledger-architecture/.

Jae Kwon et al., "A Network of Distributed Ledgers," Cosmos, dated Jul. 6, 2018, pp. 1-41, published online by Cosmos Network at URL: https://cosmos.network/docs/resources/whitepaper.html#appendix.

Mirko Boehm, "The Emerging Blockchain Innovation Landscape," dated Oct. 22, 2018, pp. 1-26, published by Open Invention Network, Durham, NC.

Jon Wright et al., "Blockchain Innovation," dated Oct. 19, 2018, pp. 1-4, published by Sterne Kessler, Washington, D.C.

Koen Lievens, "Examining Blockchain Inventions," dated Oct. 22, 2018, pp. 1-7, published by the European Patent Office, Munich, Germany.

Richard Bennett, "Scoping Roundtable for Blockchain," dated Oct. 22, 2018, pp. 1-2, published by the European Patent Office, Munich, Germany.

Deutsche Bank, "Blockchain," dated Oct. 2018, pp. 1-12, published by Deutsche Bank AG, Frankfurt, Germany.

Notice of Allowance, and List of References, from U.S. Appl. No. 16/136,700, dated Dec. 17, 2018, pp. 1-10, U.S. Patent and Trademark Office, Alexandria, VA.

Marieke Flament et al., "Blockchain Technology and Fields of Application," pp. 1-41, published by Circle Internet Financial Limited.

Georg Weber, "Searching Blockchain Patents," European Patent Office, dated Dec. 4, 2018, pp. 1-7, published by the European Patent Office, Munich, Germany.

Yann Ménière, "The emerging blockchain patent landscape," European Patent Office, dated 4, 2018, pp. 1-10, published by the European Patent Office, Munich, Germany.

Koen Lievens, "Examining Blockchain Inventions Based on our established CII practice," European Patent Office, dated Dec. 4, 2018, pp. 1-18, published by the European Patent Office, Munich, Germany.

Wang Xinyi, "How does CNIPA deal with Blockchain," dated Dec. 2018, pp. 1-23, published by National Intellectual Property Administration, Hague, Netherlands.

Nobuyuki Taniguchi, "Evolution of Blockchain-related Patents in Japan," dated Dec. 4, 2018, pp. 1-15, published by Nakamura & Partners, Tokyo, Japan.

* cited by examiner

CRYPTOLOGIC BLOCKCHAIN INTEROPERATION

CROSS REFERENCE TO RELATED APPLICATIONS

This application claims the benefit of U.S. application Ser. No. 16/116,360 filed Aug. 29, 2018, the entirety of which is hereby incorporated by reference.

TECHNICAL FIELD

This disclosure relates to distributed ledger technology and, on particular, to distributed ledger interoperability.

BACKGROUND

A distributed ledger may include a consensus of replicated and synchronized digital data across multiple nodes. Participants of a distributed ledger may apply an agreed upon protocol for, verifying, storing, and maintaining, and modifying information stored in the distributed ledger. In many examples, a distributed ledger may be implemented by way of one or more blockchains implemented in a peer-to-peer network. The unique protocol, technologies, and other design considerations of a particular distributed ledger may inhibit cohesive sharing, synchronization, and/or transferring of information with other distributed ledgers.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
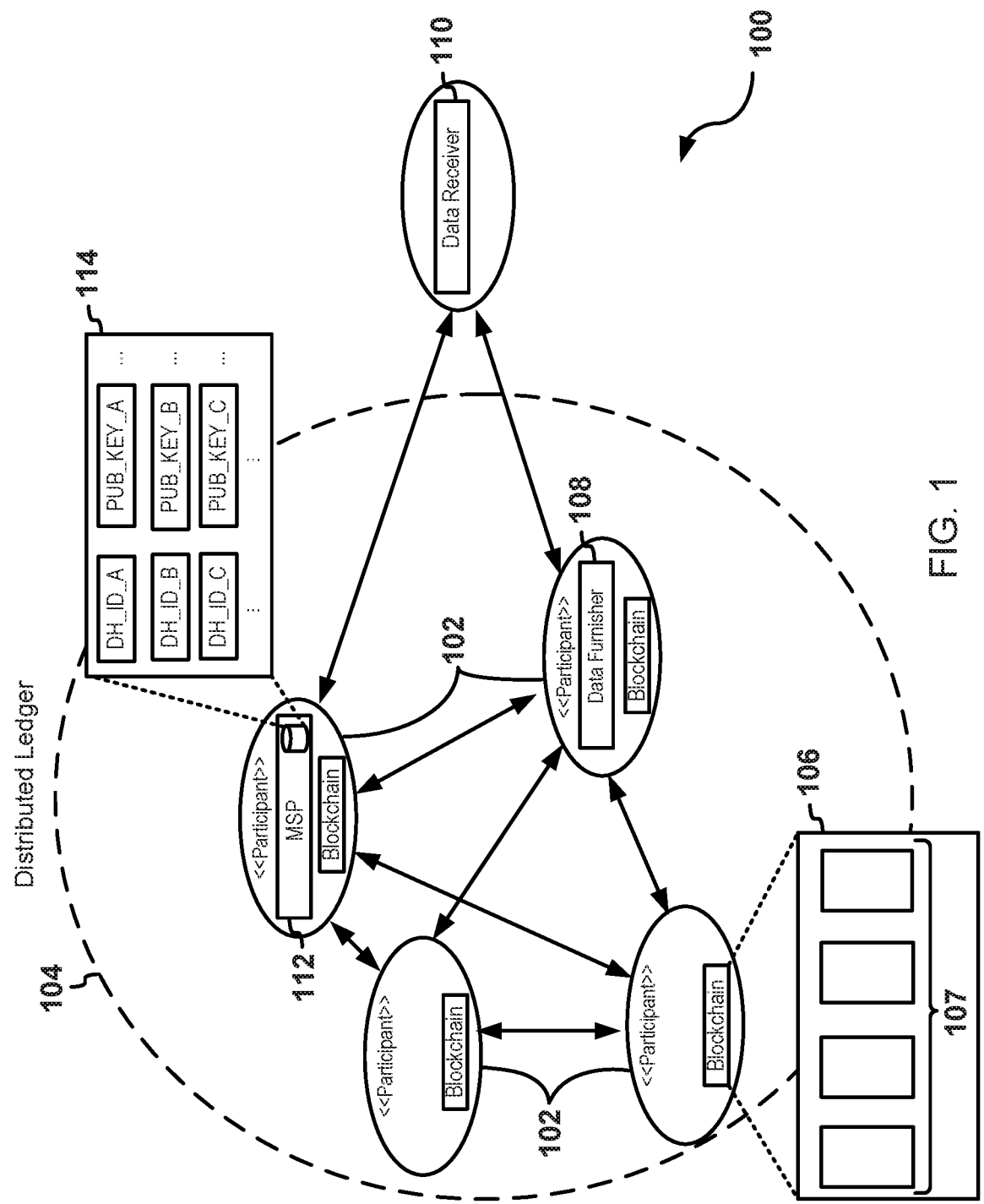
FIG. 1 illustrates a first example of an interoperable cryptologic blockchain system.

A distributed ledger technology may apply an agreed upon protocol for interaction with a blockchain. The unique protocol, technologies, and other design considerations of a particular distributed ledger may inhibit cohesive sharing, synchronization, and/or transferring of information with other distributed ledgers and/or non-participants. In some examples, sharing between distributed ledgers may occur by a computing device becoming a participant of each of the distributed ledgers. However, as more and more distributed ledger technologies become ubiquitous among various organizations, participation in multiple distributed ledger networks to provide data sharing, transferring, and synchronization between the distributed ledger networks may become cumbersome, inefficient, or otherwise undesirable.

Accordingly, there is disclosed digital systems and methods for cryptological blockchain interoperability. By way of an introductory example, a participant of a DLT network may send, to a data receiver, a participant public key for a participant of a distributed ledger technology (DLT) network. The data receiver may not be included in the DLT network or the data receiver may be a participant of a separate DLT network. The data furnisher may receive, from the data receiver, a request to share token data stored in a blockchain that stores the token data according to a DLT. The data furnisher may generate a certification that the token data is stored and/or locked on the blockchain. The certification may include a digital signature based on a participant private key paired to the participant public key. The data furnisher may transmit the certification to the data receiver. The data receiver may verify the certification based on the participant public key.

In another aspect of the system and method described herein, a furnisher participant of a furnisher DLT network may receive a request to export or share token data stored on a furnisher blockchain that stores the token data based on a furnisher DLT. The furnisher participant may transmit, to a plurality of validator participants of the furnisher DLT network, a consensus request to certify the token data is stored and/or locked on a furnisher blockchain, the consensus request indicative of the token data stored in the furnisher blockchain. The furnisher participant may receive certifications that the token data is stored and/or locked on the furnisher blockchain, the certifications respectively created by the validator participants. The certifications may include digital signatures respectively signed by the validator participants based on private keys for the validator participants. The furnisher participant may generate, in response to receipt of the certifications, a multi-signature certification message. The multi-signature certification message may include the digital signatures. The furnisher participant may communicate the multi-signature certification message to the data receiver. The data receiver may verify the digital signatures based on public keys that are paired with the respective private keys.

In another aspect of the system and methods described herein, a receiver participant of a receiver DLT network may receive a multi-signature certification message comprising digital signatures respectively signed by validator participants of a furnisher DLT network based on private keys for the validator participants. The digital signatures may be indicative of certifications that the token data is stored and/or locked on a furnisher blockchain that stores data according to a furnisher DLT. The receiver participant may verify that the digital signatures where signed by the validator participants of the furnisher DLT network by accessing a plurality of public keys that correspond to the private keys for the validator participants of the furnisher DLT network and verifying that each of the validator participants of the furnisher DLT network respectively signed digital signatures based on the public keys. The receiver participant may append to a receiver blockchain that stores data according to a receiver DLT, in response to verification that the digital signatures were signed by the validator participants of the furnisher DLT network, a datablock comprising the token data.

One example of a technical advancement achieved by the systems and methods described herein may be that information may be shared and/or exchanged between blockchains on various DLT networks. The participants of each DLT network may adhere to interoperability protocol(s) that increases speed, security, and veracity of information shared or transferred between various public or private DLT networks. For example, a membership service provider may exchange cryptological information, such as public keys, between DLT networks. The cryptological information may be accessible by participants of each DLT network. The participants of each DLT network may apply the cryptological information to validate digital signatures exchanged between DLT networks.

Another technical advancement of the systems and methods described below may be that coupling of distributed ledger technologies is minimized while cohesion between distributed ledger technologies is maximized. For example, participants of each of the DLT networks may validate information exchanged between the DLT networks without a gateway node between the DLT Networks. Consensus may be shared between DLT networks with a multi-signature message that can be validated based on the public keys and identities of participants shared between DLT networks. Information may be shared and/or exchanged between blockchains of the DLT networks even when the rules, protocols, and/or technology of the each of the DLT networks is different. The additional benefits, efficiencies, and improvements over existing market solutions are made evident in the systems and methods described below.

FIG. 1 illustrates a first example of an interoperable cryptologic blockchain system 100. The system 100 may include one or more blockchain participants 102 that participate in a DLT network 104. The blockchain participants 102 may include full or partial nodes of the DLT network 104. For example, each of the blockchain participants 102 may store and/or interact with a complete or partial copy of a blockchain 106.

The DLT network 104 may include a combination of the blockchain participants 102 that respectively communicate with a locally stored blockchain via a protocol for the distributed ledger. A participant of the DLT network may execute the consensus protocol of the DLT to determine whether to update the blockchain 106 with new information (e.g. transactions) or modifications and removal of existing information. The consensus protocol may cause the participant to communicate with other participants of the DLT network to determine changes to the blockchain are permitted. The participant(s) of the DLT network may append the information to the blockchain in response to consensus among the participants of the DLT network reaching agreement. New and/or updates to information may be appended to the blockchain according to the DLT.

The blockchain 106 may include distributed ledger that stored, organized, and/or implemented according a DLT. The blockchain 106 may include datablocks 107 that are linked according to a cryptography. The arrangement of data blocks and associations between information stored in the data blocks are established by a DLT. For example, the blockchain 106 may provide a growing, shared digital data flow, which serves as the source of truth between the blockchain participants 102. Depending on the DLT, the datablocks 107 of the blockchain 106 may include a genesis datablock that is the initial datablock of the blockchain 106. Successive datablocks may be appended to the blockchain 106 over time. The blockchain 106 may provide a chronological ledger of information. One or more of the successive datablocks may include a hash of a previous datablock, a header of the previous datablock, and/or other portions of the previous datablock, depending in the DLT. Modifications to one or more datablocks in the blockchain 106 may cause inconsistencies in the hashed information stored in the successive datablocks. The inconsistencies may be detected and the blockchain participants 102 of the DLT network 104 may prevent modification to previously appended or existing information in the blockchain 106. In some DLTs, modifications to the blockchain 106 may be prohibited unless a majority, or some other predefined number, of the blockchain participants 102 consent to the modifications.

In some examples, the blockchain 106 may include token data. As described herein, token data may refer to asset data stored on a blockchain. Token data may have various types. For example, token data may include native assets, programmed assets and/or other objects types applicable in DLT. Native assets (such as, crypto-currency coins, hard tokens, native token, and/or other spendable assets) may be compliant with a particular distributed ledger.

Programmed assets may include code, scripts, smart contracts, or other non-spendable and/or non-native token data. Programmed assets may be replicated and their state can be kept consistent where the underlying logic (e.g., in the case of code or scripts) is independent resources or environment factors particularized to a specific DLT. For example, code written in a language native to a first DLT may be transferred to a second DLT with a second, different native language where the logical structure of the code may be translated to the second native language or emulated within the environment of the second DLT.

Additionally or alternatively, programmed assets may be transferable where a particular order of events does not affect the state of the programmed asset. DLTs may resolve disagreements in event sequences through consensus. However, consensus on one DLT may be independent of consensus on a second. Accordingly, different DLTs may not necessarily agree upon a common order for the same events because the DLTs may represent independent consensus regions. Therefore, for an order-dependent programmed asset, the state of the asset on a first DLT may not necessarily inform the proper state for the order-dependent programmed asset on another DLT. In some cases, a portion of an order-dependent programmed asset may be order independent.

At least one of the blockchain participants 102 may include a data furnisher 108. The data furnisher 108 may furnish particular information stored in the blockchain 106 to one or more receivers external to the DLT network 104. In some examples, the data furnisher 108 may be authorized to access and/or manage particular information stored in the blockchain 106. Alternatively or in addition, the data furnisher 108 may provide a human or non-human entity with access to the DLT network 104. In some examples, the DLT network 104 may include one data furnisher. Alternatively, the DLT network 104 may include multiple data furnishers.

The system may further include a data receiver 110. The data receiver 110 may include a non-participant of the DLT network 104. Alternatively or in addition, the data receiver 110 may include a participant of a separate DLT network (See FIG. 5 for an example). Unlike the data furnisher 108, the data receiver 110 may not have access to the blockchain 106 for the DLT network 104. The data receiver 110 may receive the token data stored in the blockchain 106 from one or more blockchain participants 102, such as the data furnisher 108.

In many circumstances, it may be desirable to share and/or export token data stored in the blockchain 106 with external entities, such as the data receiver 110, without adding participants to the DLT network 104. In the example illustrated in FIG. 1, sharing and/or exporting information to/with the data receiver 110 presents technical challenges, including, among other challenges described here, the ability for the data receiver 110 to verify that the token data is present on the blockchain 106 and/or the token data authorized for sharing/export, prevention double spend between the blockchain participants 102 of the DLT network 104 and non-participants, and ensuring synchronization of the token data between participants of the DLT network 104 and non-participants of the DLT network 104. Participants of the DLT network may provide a certification of the token data.

As described herein, a certification of the token data may include a confirmation between participants of the DLT network 104 as to the state of the token data stored on the blockchain. The certification of the token data may include an event proof corresponding to the token data. Alternatively or in addition, The certification of the token data may include a verification that one or more participants agree that a particular event corresponding to the token data is valid and/or present on the blockchain. For example, the certification of the token data may include a verification that one copy of the token data exists on the blockchain. Alternatively or in addition, the certification information may include a verification that the token data has not been transferred or exported to any other entity or blockchain. In examples where the token data is being exported, the certification of the token data may include a verification that one or more participants agree that the token data is locked on the blockchain. In some examples, the certification may include a digital signature of a set of information.

The digital signature may include information that is encrypted by a source, such as the data furnisher 108. The information may include, for example, the token, an authorization to share or export the token data, and/or an identifier of the token data, and/or a transaction. The information may be encrypted based on a private key that is mathematically linked to a public key. The public key corresponding to the private key may unlock, decrypt, and/or verify the encrypted data. In an example, the digital signature may include a hash of data to be signed. The data furnisher 108 may obtain a private key and encrypt the hash of data based on the private key. The digital signature may include the encrypted hash and in some examples, information related to the encryption (such as the hashing algorithm). In general, to sign information refers to encrypting and/or encoding a piece of information based on a private key that can be decrypted and/or decoded based on the public key.

In some examples, the digital signature may be a multi-signature. A multi-signature may be a digital signature in which information is signed by multiple parities. For example, information, such as the token, an authorization to share or export the token data, and/or an identifier of the token data, and/or a transaction, may be encrypted based on the private key of multiple participants of the DLT network 104.

At least one of the blockchain participants 102 may further include a membership service provider 112. The membership service provider 112 may provide access to the identities and cryptological information associated with the blockchain participants 102 of the DLT network 104. Alternatively or in addition, the membership service provider 112 may provide the identities of participants and non-participants of the DLT network 104. For example, the membership service provider 112 may receive identification information and public key information provided by the data furnisher 108 and/or the data receiver 110.

The membership service provider 112 may include a membership service repository 114. The membership service repository 114 may include a database or memory that stores the identities and cryptological information associated with participants and non-participants of the DLT network 104. For example, the membership service repository 114 may include associations between the identities and the cryptological information. The identities may include IP addresses, MAC addresses, host names, user names, and/or any other information that identifies a participant or non-participant of the DLT network 104. The cryptological information may include any information that is used to ensure the authenticity of a digital signature. For example, the cryptological information may include a public key that corresponds to a private key that is applied to generate a digital signature.

In some examples, the data receiver 110 may communicate with the membership service provider 112 to receive the public key of the data furnisher 108 or multiple data furnishers. In some examples, the data receiver 110 may submit a message or query to the membership service provider 112. After receiving one or more public key, the data receiver 110 may verify the truth of token data shared by or exported from the DLT network 104. For example, the data receiver 110 may receive certification information from the data furnisher 108 (or some other participant of the DLT network 104. The certification information may include a digital signature corresponding to the token data. The digital signature may include a certification that the data furnisher 108 has agreed to export and/or share the token data. The data receiver 110 may confirm that the data furnisher 108 signed the digital signature based on the public key of the data furnisher 108.

Figure 2:
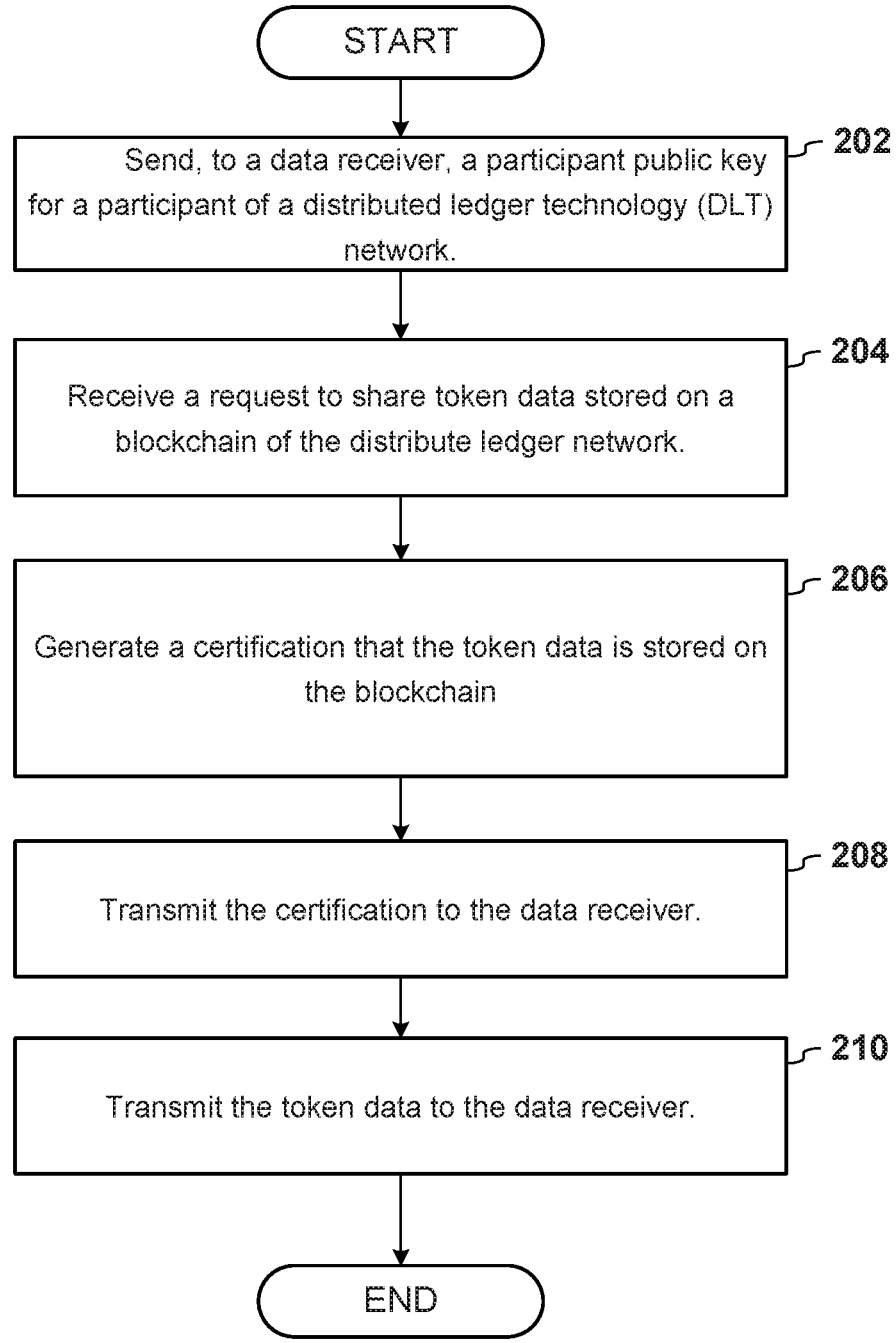
FIG. 2 illustrates a first example of a flow diagram for logic of an interoperable cryptologic blockchain system.

FIG. 2 illustrates a first example of a flow diagram for logic of the interoperable cryptologic blockchain system 100. The membership service provider 112 may send, to the data receiver 110, a participant public key for a participant of the DLT network 104 (202). For example, the data receiver 110 may communicate a request to the membership service provider 112 for the public key of one or more data furnishers for token data stored in the blockchain 106. The query request may include an identifier of the one or more data furnishers. The membership service provider 112 may search the membership service repository 114 and select one or more public keys corresponding to the data furnishers. The membership service provider 112 may provide the public keys to the data receiver 110.

A blockchain participant may receive, from the data receiver 110, a request to share token data stored in the blockchain 106 of the DLT network 104 (204). In some examples, the blockchain participant may include the data furnisher 108. Alternatively or in addition, the blockchain participant may include the membership service provider 112. For example, a blockchain participant may include logic for the data furnisher 108 and logic for the membership service provider 112. In other examples, the data furnisher 108 may be physically or logically separated from the membership service provider 112.

The blockchain participant may generate a certification of the token data (206). In examples where the token data is being exported, the certification may include a certification that the token data is locked on the blockchain. The certification may include a digital signature based on a participant private key and a participant public key. For example, the data furnisher 108 may sign the digital signature with the participant private key. Alternatively or in addition, the certification may include multiple digital signatures and/or a multi-signature signed by multiple participants of the DLT network 104. The blockchain participant or participant(s) may have previously shared a corresponding public key with the membership service provider 112 that can be used to validate the multi-signature.

In some examples, multiple blockchains may communicate with each other via a communications medium and/or the blockchain 106, to certify information to be shared and/or exported from the DLT network 104. In one example, each of the blockchain participants 102 may identify the request from the data receiver 110 on a local blockchain in response to the local blockchain being synchronized according to a protocol of the DLT network 104. Alternatively or in addition, the data furnisher 108 may communicate with one or more additional participants to obtain the digital signatures.

The blockchain participant may transmit the certification to the data receiver 110 (208). For example, the data furnisher 108 may send the certification to the data receiver 110. The data receiver 110 may verify the certification based on the participant public key(s). For example, the data receiver 110 may determine that the digital signature was created by the data furnisher 108 based on the public key of the data furnisher 108 provided by the membership service provider 112. In some examples, the data receiver 110 may receive a multi-signature or multiple digital signatures that are respectively signed by multiple participants. The data receiver 110 verify that each of the digital signatures were signed by a corresponding one of the multiple data furnishers. For example, each of the participant(s) may separately communicate the digital signature to the data receiver 110. Alternatively or in addition, the data furnisher 108 of one participant may communicate all of the digital signatures. Accordingly, the data receiver 110 may verify that the all data participants and/or a sub-set of the participants have certified the token data.

In some examples, the certification may include the token data. For example, the token data may be encrypted based on one or more private keys of participants in the DLT network 104. Accordingly, when the certification is transmitted, the token data may also be transmitted. In other examples, the certification may include identifying information for the token data that may be subsequently used to access the token data.

The blockchain participant may transmit the token data to the data receiver (210). For example, the blockchain participant may transmit the token data to the data receiver in response to the data receive being authorized to access the token data. The certification may be determined based on one or more digital signatures of data furnishers that agree to share and/or export the data. For example, the data furnisher 108 may access the token data from the receiver blockchain. In some examples, the token data may be included in one or more datablocks on the blockchain. The data furnisher may communicate the token data and/or the datablock(s) to the data receiver.

In examples, where the token data is exported to the data receiver, the blockchain participant may lock token data within DLT network 104. The data furnisher 108 may lock the token data by adding a data block to the blockchain in accordance with the DLT. The datablock may indicate that the token data is locked. The data furnisher 108, and/or other participants of the DLT network 104, may restrict certain information from being appended to the blockchain in response to the token data being locked. Alternatively or in addition, the participants of the DLT network 104 may invalidate additional datablocks comprising update information corresponding to the token data.

Figure 3:
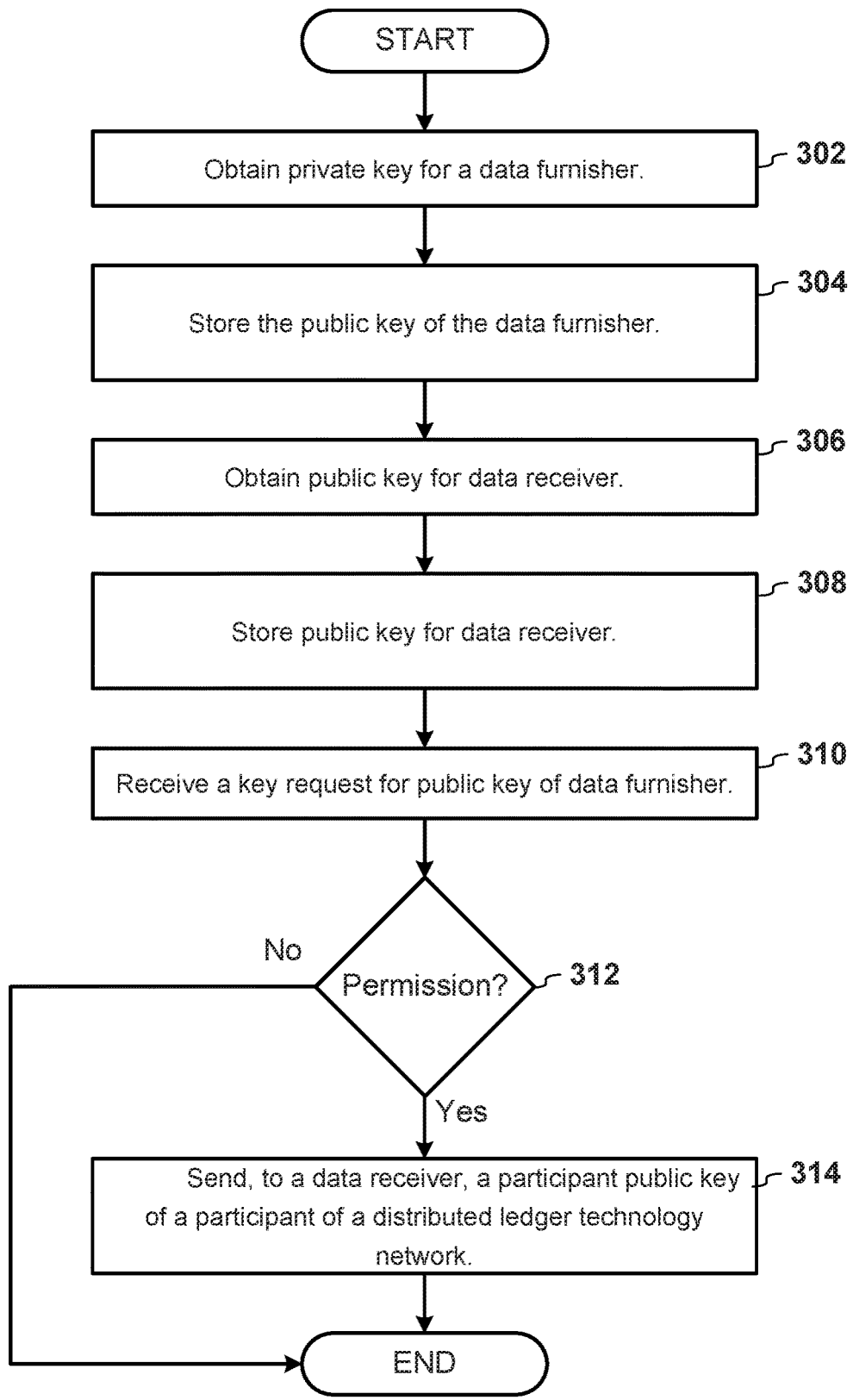
FIG. 3 illustrates a second example of a flow diagram for logic of an interoperable cryptologic blockchain system.

FIG. 3 illustrates a second example of a flow diagram for logic of the interoperable cryptologic blockchain system 100. The membership service provider 112 may obtain a private key for the data furnisher 108 (302). For example, the data furnisher 108 may generate a private key and public key pair. The data furnisher 108 may communicate the public key to the membership service provider 112.

The membership service provider 112 may store the public key (304). For example, the membership service provider 112 may store the public key in the membership service repository 114. In some examples, the membership service repository 114 may include the identifier of the data furnisher 108 that provided the public key. The identifier of the data furnisher 108 may be associated with the public key in the membership service repository 114.

The membership service provider 112 may obtain a public key for data receiver 110 (306). For example, the data receiver 110 may communicate the public key of the data receiver 110 to the membership service provider 112. Alternatively or in addition, the data receiver 110 may communicate an identifier of the data receiver 110 to the membership service provider 112.

The membership service provider 112 may store the public key of the data receiver 110 (308). For example, the membership service provider 112 may store the public key in the membership service repository 114. In some examples, the public key for the data receiver 110 may be associated with the identifier of the data receiver 110. The membership service provider 112 may provide the public key of the data receiver 110 based on identifying information corresponding to the data receiver 110.

The membership service provider 112 may receive a key request for a public key of a data furnisher (310). In some examples, the key request may include an identifier of the data receiver 110 and/or an identifier of a data holder. The membership service provider 112 may provide the public key of the data furnisher 108 and/or the data receiver 110 based on the key request.

The membership service provider 112 may determine whether the data receiver 110 is permitted to receive the public key of one or more data furnishers (312). For example, the membership service repository 114 may include a share permission that specifies a correspondence between one or more data furnishers and one or more data receivers. The share permission may have been previously communicated to the membership service provider 112. The share permission may include identifiers corresponding to the one or more data furnishers and/or one or more data receivers. The share permission may indicate, for example, that the public key of a data furnisher is or is not permitted to be shared with any data receiver and/or with specified data receivers.

In response to determination that the data receiver 110 is permitted to receive the public key of the data furnisher 108, the membership service provider 112 may send, to the data receiver 110, the public key for a participant, such as the data furnisher 108, of the DLT network 104 (314).

Figure 4:
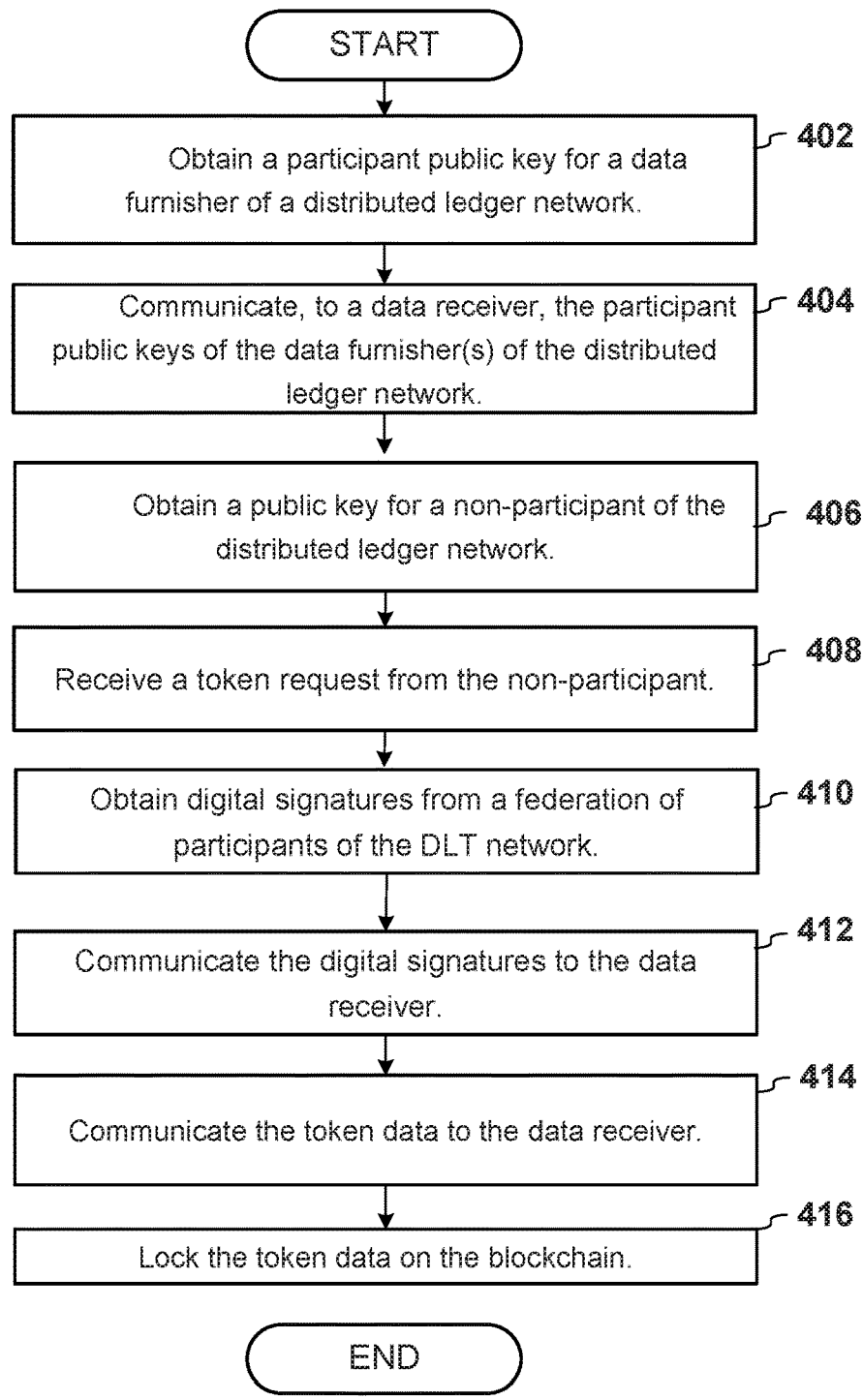
FIG. 4 illustrates a third example of a flow diagram for logic of an interoperable cryptologic blockchain system.

FIG. 4 illustrates a third example of a flow diagram for logic of the interoperable cryptologic blockchain system 100. The membership service provider 112 may obtain a participant public key for a data furnisher 108 of the DLT network 104 (402). For example, the data furnisher 108 may generate a private key and public key pair for a participant. The data furnisher 108 may communicate the public key to the membership service provider 112. Alternatively or in addition, the membership service provider 112 may obtain the public key of multiple participants within the DLT network 104. The membership service provider 112 may store the public key(s) of the participant(s). For example, the membership service provider 112 may store the public key(s) in the membership service repository 114. In some examples, the membership service repository 114 may include the identifier of the participants that provided the public keys. The identifier of the participants may each be associated with a corresponding public key in the membership service repository 114.

The membership service provider 112 may communicate, to the data receiver 110, the participant public key(s) of the participants of the DLT network 104 (404). For example, the data receiver 110 request the public keys of one or more data furnishers that are participants of the DLT network 104. The query request may include the identifiers of the one or more data participants. The membership service provider 112 may communicate the public key(s) of the data furnishers that correspond to the identifiers of the one or more data furnishers.

The membership service provider 112 may obtain a non-participant public key for a non-participant of the DLT network 104 (406). For example, the non-participant may include the data receiver 110. The data receiver 110 may communicate a public key to the membership service provider. The public key may correspond to a private key used to sign information.

The data furnisher 108 may receive a token data request from the non-participant (408). The token data request may identify the token data to be exported from the DLT network 104. In some examples, the data furnisher, and/or other participants of the DLT network 104, may prohibit additional information related to updates to the token data to be added to the block chain after the token data is locked.

The data furnisher 108 may obtain digital signatures from a federation of participants of the DLT network 104 (410). The federation of participants may include a subset of participants of the DLT network 104. The federation of participants may have previously agreed, with the data receiver, to share or export the token data. For example, the federal of participants may each have authority to export or share the token data. The digital signatures may certify that the each participant included in the federation of participants confirm that the token data is stored and/or locked on the blockchain for the furnisher DLT network 104.

The data furnisher 108 may communicate the digital signatures to the data receiver (412). The digital signatures may include digital signatures of the token data or a proof of the token data's existence on the blockchain, such as an identifier of the token data. The digital signatures may be signed based on the private keys of the federation of participants. The corresponding public keys of the federation of participants may be stored in the membership service provider 112. The data receiver 110 may access the public keys from the membership service provider 112 to verify the digital signatures. The membership service provider 112 may associate the public keys of the federation of participants may be associated with identifiers for the federation of participants. The data receiver may access the public keys from the membership service provider 112 based on the identifiers for the federation of participants.

The data furnisher 108 may communicate the token data to the data receiver (414). In some examples, the token request received by the data furnisher 108 may include a request to share the data. In such examples, the token data may remain unlocked on the blockchain 106. Alternatively, the token request may include a request to export the token data. In response to request to export the token data, the data furnisher 108 may lock the token data on the blockchain 106 (416).

Figure 5:
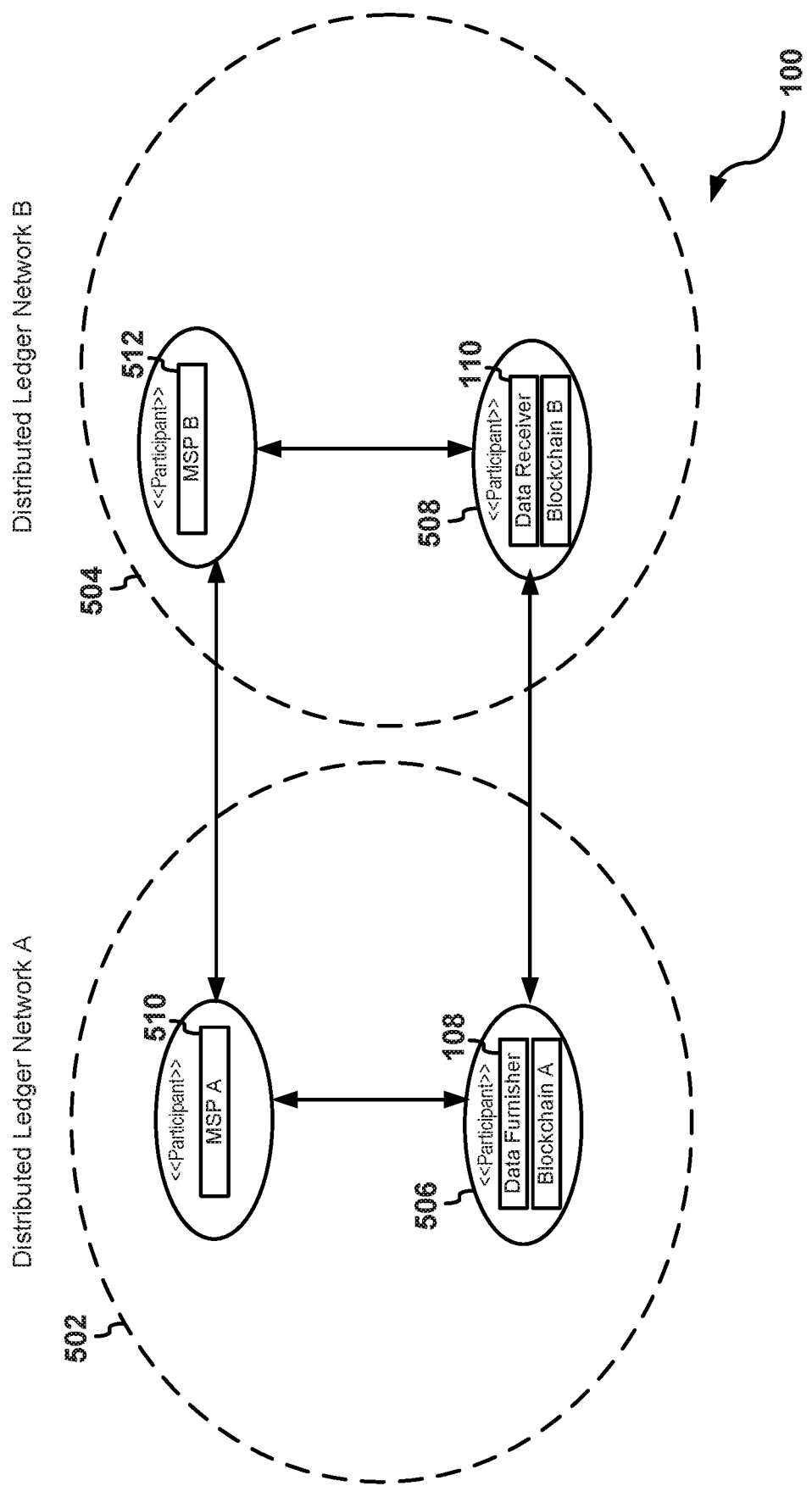
FIG. 5 illustrates a second example of an interoperable cryptologic blockchain system.

FIG. 5 illustrates a second example of the interoperable cryptologic blockchain system 100. In some examples, the system 100 may include multiple DLT networks. For example, the system 100 may include a furnisher DLT network 502 and/or a receiver DLT network 504. The furnisher DLT network 502 and/or the receiver DLT network 504 may each be examples of the DLT network 104 illustrated in FIG. 1.

The furnisher DLT network 502 may include a furnisher participant. The furnisher participant 506 may refer to at least one of the participants 102 (FIG. 1) that includes and/or accesses the data furnisher 108. The receiver DLT network 504 may include a receiver participant 508. The receiver participant may refer to at least one of the participants 102 that includes and/or accesses the data receiver 110.

The furnisher DLT network 502 is illustrated with one participant, but the furnisher DLT network 502 may, in other examples, include multiple participants that include respective data furnishers. Likewise, the receiver DLT network 504 may include multiple participants that include corresponding data receivers.

The data furnisher 108 may store and/or access a furnisher blockchain. The data receiver 110 may store and/or access a receiver blockchain. The furnisher blockchain and the receiver blockchain may each be managed and maintained according to the respective DLT for each DLT network. The DLT for the furnisher DLT network 502 may be different that the DLT for the receiver DLT network 504.

The data furnisher 108 may share and/or export token data with the data receiver 110. In some examples, multiple participants of the furnisher DLT network 502 may have an interest in the token data. The data receiver 110 may determine whether all data furnishers have agreed to share or export the token data from the furnisher DLT network 502. The data receiver 110 and the data furnisher 108 may apply cryptological security to ensure the secure, authorized, and synchronized transferring of information between DLT networks. For example, the data furnisher 108 and/or other participants of the furnisher DLT network 502 may each generate a digital signature based on a private key and public key pair.

In some examples, the one or more participants of the furnisher DLT network 502 may include a furnisher MSP 510. Alternatively or in addition, one or more participants of the receiver DLT may include a receiver MSP 512. The furnisher MSP 510 and the receiver MSP 512 may exchange the public keys and/or identities of the participants of each respective DLT network. The furnisher MSP 510 may store the public keys and/or identities of participants of the furnisher DLT network 502 and the receiver DLT network 504. The receiver MSP 512 may or store the public keys and/or identities of participants of the receiver DLT network 504 and the furnisher DLT network 502.

In some examples, participants of the furnisher DLT network 502 and/or the receiver DLT network 504 may apply a consensus protocol to reach consensus regarding verifying token data stored on the blockchain, authorizing sharing of token data and/or authorized exporting of token data between DLT networks. For example, multiple participants of the receiver DLT network 504 may have an interest in data being shared or exported from the furnisher DLT network 502. Alternatively or in addition, multiple participants of the furnisher DLT network 502 may have an interest in data received by the receiver DLT network 504. The participants of the receiver DLT network 504 may acquire certifications of the token data from one or more participants of the furnisher DLT network 502.

In an example, the participants of the furnisher DLT network 502 may include, for example, branches of a bank that wish to transfer digital currency. The participants of the receiver DLT network 504 may include participants that wish to receive digital currency from the furnisher DLT network 502. The bank branches of the furnisher DLT network 502 may reach consensus before transferring the digital currency to one or more bank branches of the receiver DLT network 504. Alternatively or in addition, the bank branches of the receiver DLT network 504 may wish to reach consensus on receiving the digital currency.

Figure 6:
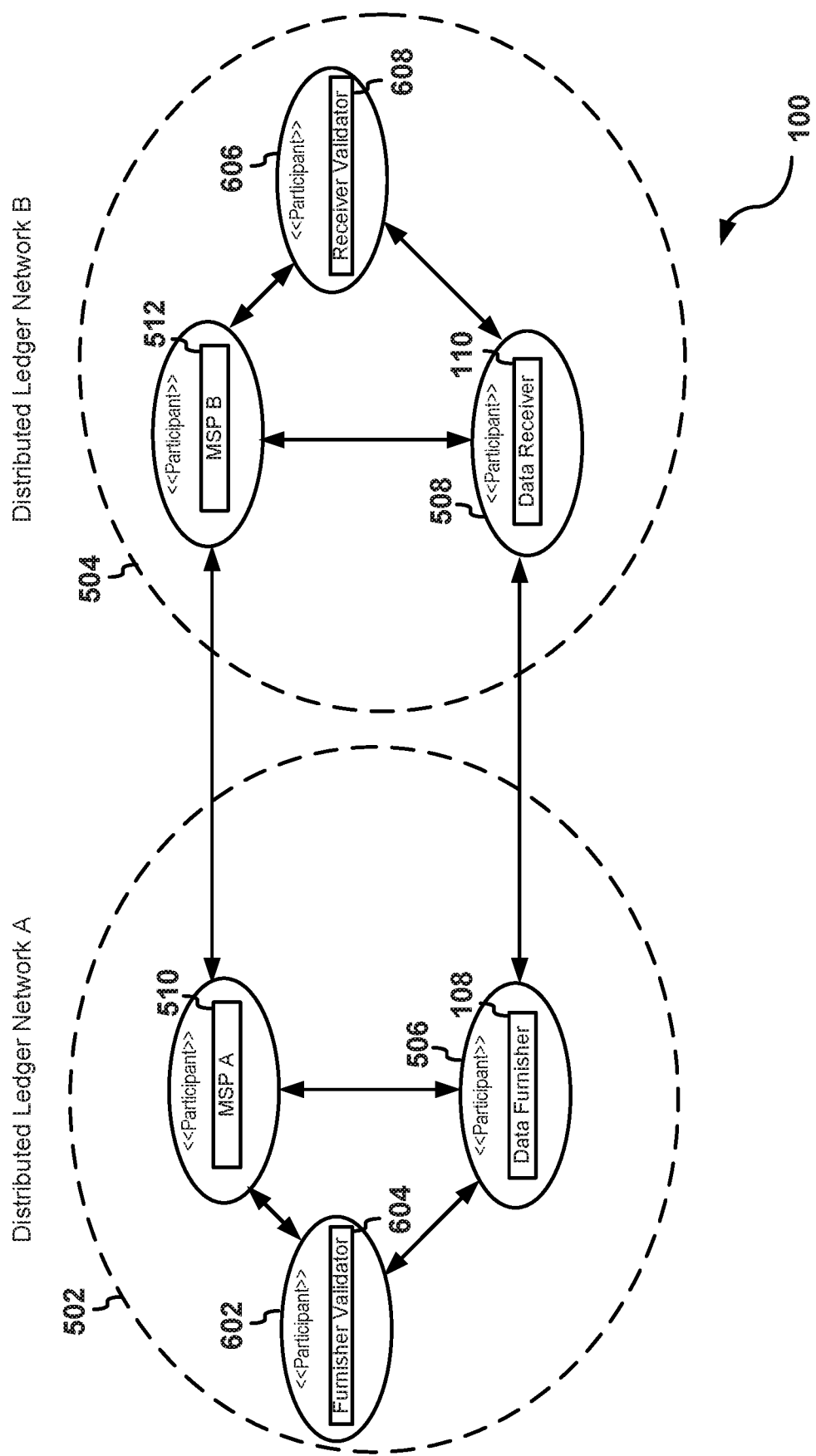
FIG. 6 illustrates a third example of an interoperable cryptologic blockchain system.

FIG. 6 illustrates a third example of the interoperable cryptologic blockchain system 100. The furnisher DLT network 502 may include a furnisher validator participant 602, or multiple furnisher validator participants. The furnisher validator participant 602 may include a full or partial node of the furnisher DLT network 502. The furnisher validator participant 602 may include at least one of the participants 102 described in reference to FIG. 1. For example, the furnisher validator participant 602 may include a copy of one or more blockchain compliant with the furnisher DLT. The furnisher validator participant 602 may add information, update information, and/or otherwise access information on the local blockchain in a manner compliant with the furnisher DLT network 502. Alternatively or in addition, the furnisher validator participant 602 may synchronize and/or validate its local blockchain(s) with other full or partial nodes of the furnisher DLT network 502 in a manner that compliant with the furnisher DLT.

The furnisher validator participant 602 may include a furnisher validator 604. The furnisher validator 604 may certify that token data is stored and/or locked on the furnisher blockchain. Alternatively or in addition, the furnisher validator 604 may provide consensus to share and/or export data from the furnisher DLT network 502. The furnisher validator 604 may communicate with one or more participants of the furnisher DLT network 502 to certify token data stored and/or locked on the furnisher blockchain. For example, the furnisher validator 604 may detect that consensus is being requested. In some examples, the furnisher validator 604 may receive a consensus request via a communications channel, such as a message broker, a RESTful interface, or some other suitable communications interface. Alternatively or in addition, the furnisher validator 604 may detect activity on the furnisher blockchain, such as a request to share or export data, and, in response, provide consensus that the token data is stored and/or locked on the blockchain.

The furnisher validator 604 may generate a digital signature to certify the token data and/or authorize the token data from the furnisher DLT network 502 to be shared and/or exported. For example, the furnisher validator 604 may generate a private key that is paired with a public key. The furnisher validator participant 602 may sign and/or generate a digital signature based on the private key. The furnisher validator 604 may communicate the public key to the furnisher MSP 510, or some other MSP or service, depending on the implementation.

The receiver DLT network 504 may include a receiver validator participant 606, or multiple furnisher validator participants. The receiver validator participant 606 may include a full or partial node of the receiver DLT network 504. For example, the receiver validator participant 606 may include a copy of one or more blockchain compliant with the receiver DLT. The receiver validator participant 606 may add information, update information, and/or otherwise access information on the local blockchain in a manner compliant with the receiver DLT network 504. Alternatively or in addition, the receiver validator participant 606 may synchronize and/or validate its local blockchain(s) with other full or partial nodes of the receiver validator participant 606 in a manner that is compliant with the receiver DLT.

The receiver validator participant 606 may include a receiver validator 608. The receiver validator may generate a digital signature that indicates the receiver validator participant 606 consents to the certification of the furnisher validator participants and the information being shared with and/or imported by the receiver DLT network 504. For example, the receiver validator 606 may generate a private key that is paired with a public key. The receiver validator 606 may generate a digital signature based on the private key. The receiver validator 606 may communicate the public key to the receiver MSP 512, or some other MSP or service, depending on the implementation. The receiver validator 606 may communicate an identifier of the of receiver validator 606 such that the MSP establishes a searchable association between the public key and the identity of the receiver validator 606.

Figure 7:
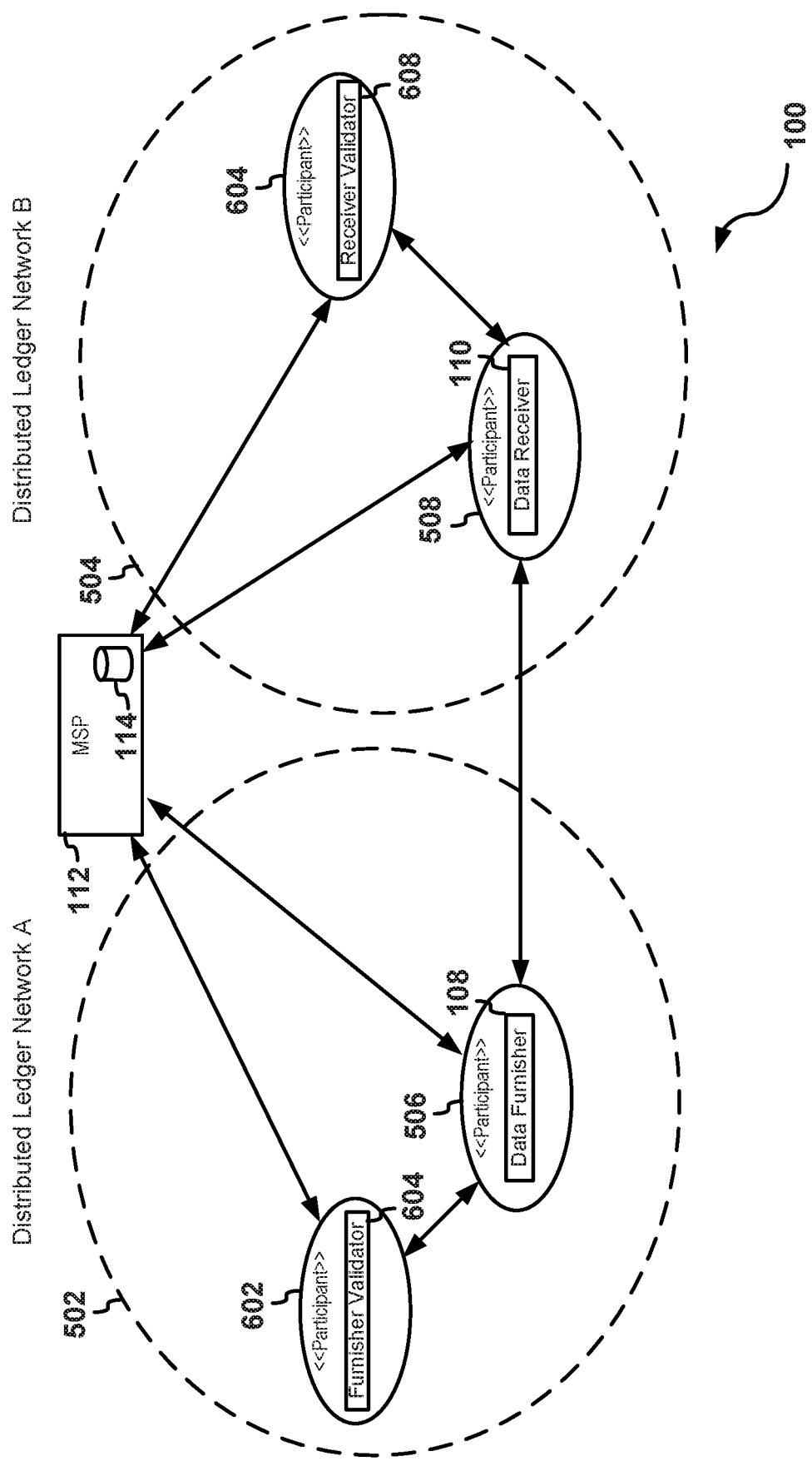
FIG. 7 illustrates a fourth example of an interoperable cryptologic blockchain system.

FIG. 7 illustrates a fourth example of the interoperable cryptologic blockchain system 100. In the example illustrated in FIG. 7, the membership service provider 112 may be shared between multiple DLT networks. For example, participants of the furnisher DLT network 502 and/or the receiver DLT network 504 may communicate public key and identify information to the membership service provider 112. The public key and/or identity information may be stored in the membership service repository 114. Alternatively or in addition, participants of the furnisher DLT network 502 and/or the receiver DLT network 504 may access the membership service provider 112 to receive the identity information and/or the public key information. The membership service provider 112 may be external to both the furnisher DLT network 502 and/or the receiver DLT network 504. Alternatively, the membership service provider 112 may be configured on a full or partial node of the furnisher DLT network 502 and/or the receiver DLT network 504.

Figure 8:
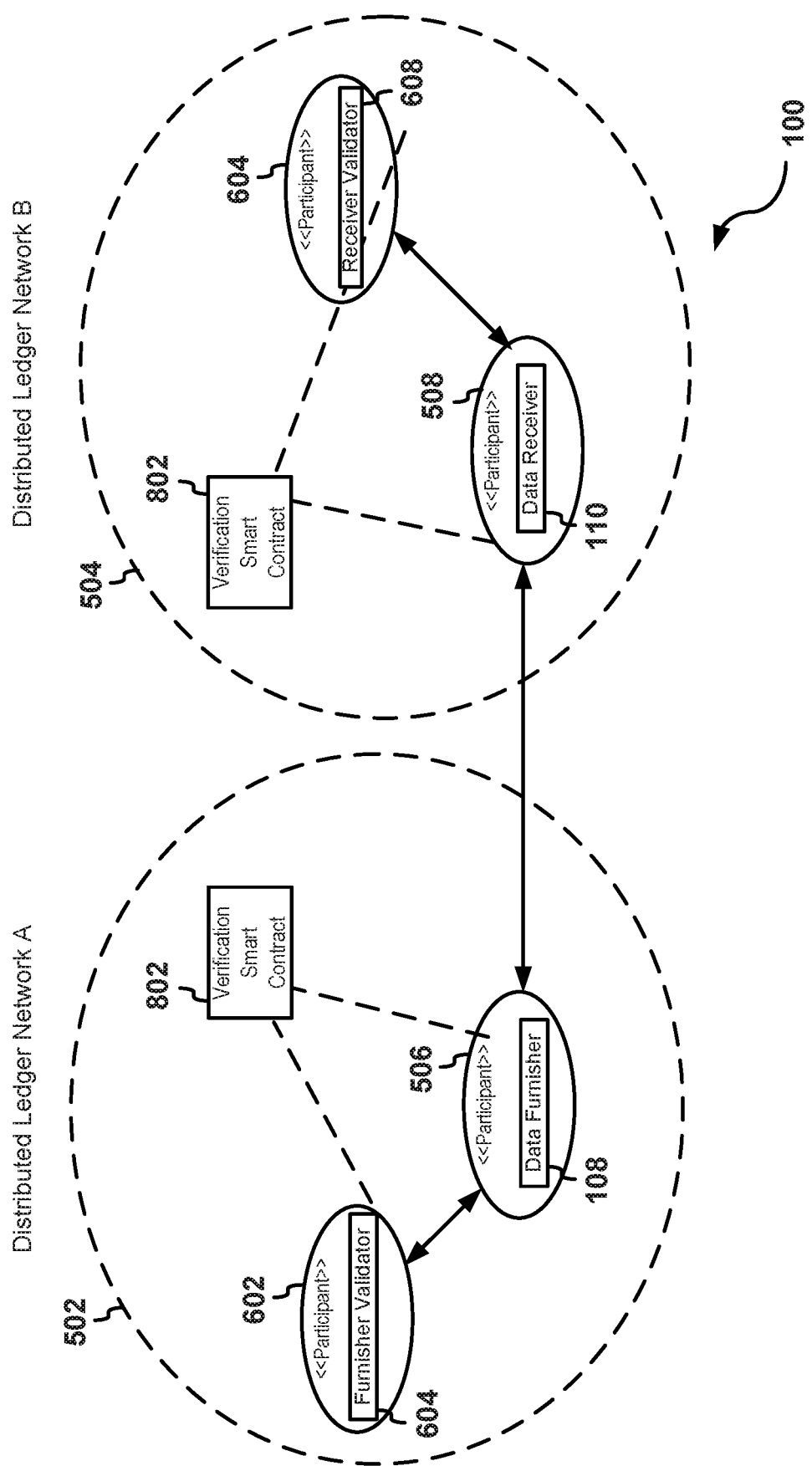
FIG. 8 illustrates a fifth example of an interoperable cryptologic blockchain system.

FIG. 8 illustrates a fifth example of the interoperable cryptologic blockchain system 100. In some examples, the participants of the receiver DLT network 504 may access a verification smart contract 802 to verify a digital signature provided by one or more participants of the furnisher DLT network 502.

The verification smart contract 802 may include parameters and self-executable logic. For example, the verification smart contract 802 may include the public keys and/or the identifiers of the participants of the furnisher DLT network 502. The participants of the receiver DLT network 504 may access the public keys from the verification smart contract 802. For example, the receiver validator 608 of the receiver validator participant 606 may receive a digital signature signed by the furnisher participant 506 based on a private key. A public key stored in the verification smart contract may correspond to the private key. The receiver validator 608 may access the public key from the verification smart contract 802 to verify that the furnisher participant 506 signed the digital signature.

DLT networks engaged in interoperability may have access to a local copy of the verification smart contract 802. For example, the furnisher DLT network 502 may have access a corresponding version of the verification smart contract 802 that the receiver DLT 504 access. The verification smart contract 802 may be stored on the blockchains of each respective DLT network. Alternatively or in addition, the verification smart contract may be installed in some other data source within each respective DLT network. Accordingly, nodes of each DLT network may access their own verification smart contract, which behaves the same way, but exposes a different set of identities, such as foreign public keys that are needed to recognize foreign digital signatures.

In some examples, the verification smart contract 802 may include self-executing logic that causes a participant of the receiver DLT network 504 to verify one or more digital signatures. For example, the self-executing logic may receive one or more digital signatures and verify the digital signatures based on public keys included in the verification smart contract 802 or stored in a location referenced by the verification smart contract 802.

One or more participants of the furnisher DLT network 502 may provide the verification smart contract 802 to the receiver DLT network 504. For example, the furnisher participant 506 may communicate the verification smart contract 802 to the receiver DLT network 504. One or more participants of the receiver DLT network 504 may consent to the verification smart contract 802. In some examples, the verification smart contract 802 may include the identifiers of the participants of the receiver DLT network 504 that should consent to the verification smart contract 802. In some examples, the verification smart contract 802 may be stored on the receiver blockchain, which is replicated between participants of the receiver DLT network 504. In other examples, the verification smart contract 802 may be accessible to the participants of the receiver DLT network 504 via some other communication channel or storage medium.

In some implementations, the digital signatures and/or the multi-signature message sent from the furnisher DLT network 502 may follow some proprietary format. By way of the verification smart contract 802, the furnisher DLT network 502 may provide the self-executing verification logic that is used by other DLT networks to interoperate with the furnisher DLT network 502. The self-executing logic of the verification smart contract 802 may include logic that verifies one or more digital signature provided by the furnisher DLT network 502, even when the format of the digital signatures or multi-signature certification message is native to the furnisher DLT network 502.

Figure 9:
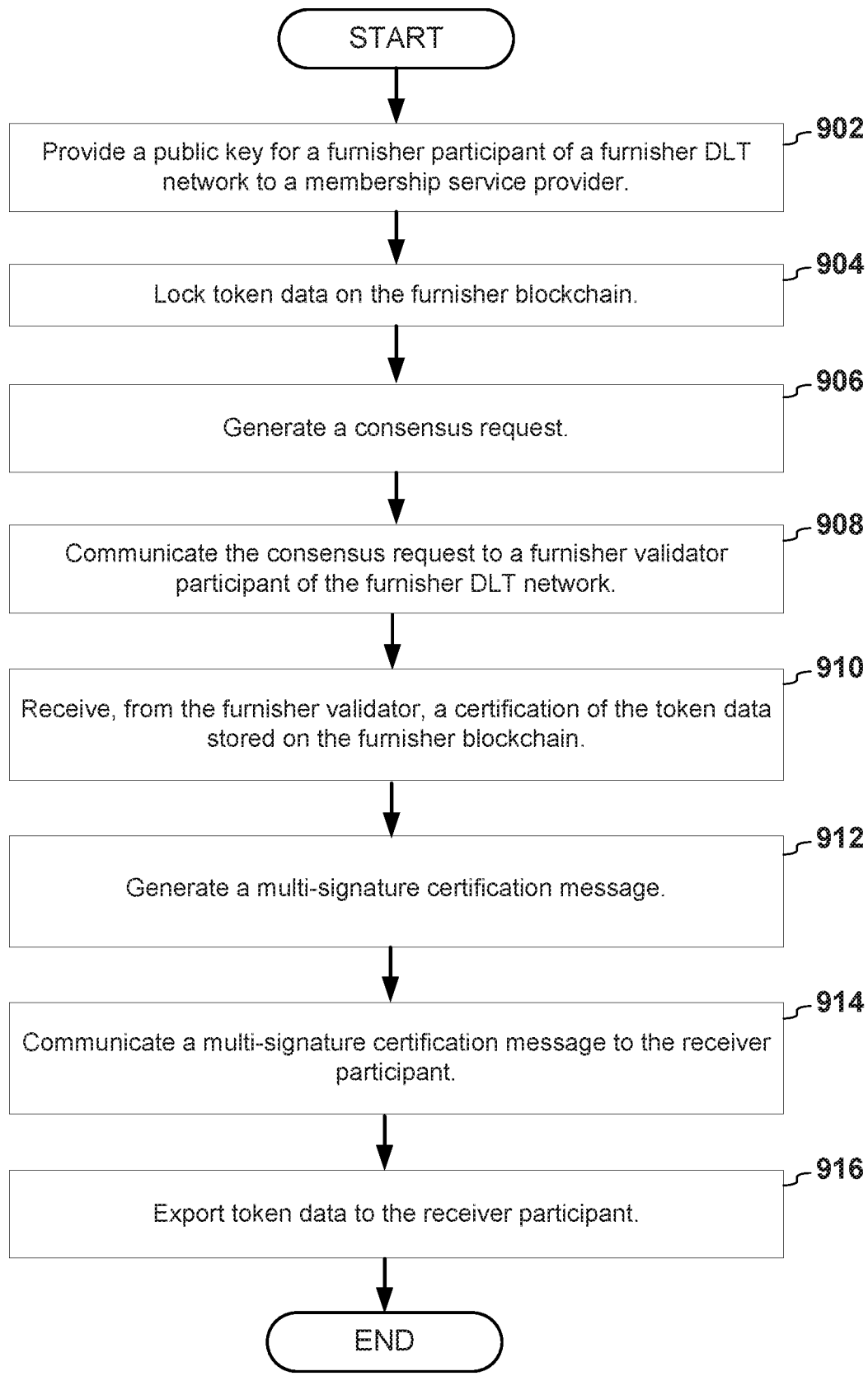
FIG. 9 illustrates a fourth example of a flow diagram for logic of an interoperable cryptologic blockchain system.

FIG. 9 illustrates a fourth example of a flow diagram for logic of the interoperable cryptologic blockchain system 100. The furnisher participant 506 of the furnisher DLT network 502 may provide a public key of the furnisher participant 506 to the membership service provider 112 (902). The public key may be paired with a private key for the furnisher participant 506. The furnisher participant 506 may sign a digital signature based on the private kay. The signatures may be verified with the public key of the furnisher participant 506. The membership service provider 112 may store a plurality of public keys and/or identities corresponding to the participants of the furnisher DLT network 502. For example, the participants of the furnisher DLT network 502 may include the furnisher participant 506, a furnisher validator participant 602, and/or other nodes of the furnisher DLT network 502.

The furnisher participant 506 of the furnisher DLT network 502 may lock token data within the furnisher DLT network 502 (904). The token data may correspond to data to be exported from the furnisher DLT network 502. The furnisher participant 506 may lock the token data by adding a data block to the furnisher blockchain in accordance with the furnisher DLT. The datablock may indicate that the token data is locked. The furnisher participant 506, and/or other participants of the furnisher DLT network 502, may restrict certain information being appended to the furnisher blockchain in response to the token data being locked. Alternatively or in addition, the participants of the furnisher DLT network 502 may invalidate additional datablocks comprising update information corresponding to the token data.

The furnisher participant 506 may generate a consensus request (906). The consensus request may include a request to validate the token data stored on the furnisher blockchain and gather validator signatures. The consensus request may be indicative of the token data stored on the furnisher blockchain. For example, the consensus request may comprise an identifier of the token data and/or information that may identify the token data in the furnisher blockchain.

The furnisher participant 506 may communicate the consensus request to the furnisher validator participant 602 (908). For example, the furnisher participant 506 may communicate the consensus request to the furnisher validator participant 602 via a communication channel between the furnisher participant 506 and the furnisher validator participant 602, such as a message broker, a RESTful HTTP calls, or some other medium or protocol. Alternatively or in addition, the furnisher participant 506 may communicate the consensus request to the furnisher validator participant 602 via the furnisher blockchain. For example, the furnisher participant 506 may append a datablock to the furnisher blockchain. The datablock may include the consensus request. The furnisher validator participant 602 may detect the datablock on a local copy of furnisher blockchain and then respond to the request.

The furnisher participant 506 may receive a certification of the token data (910). For example, the furnisher validator participant 602 may communicate the certification to the furnisher participant 506 via a communication channel between the furnisher participant 506 and one or more furnisher validator participants. Alternatively or in addition, the furnisher validator 604 may communicate the certification directly to the receiver participant 508. The certification may include a digital signature signed by the furnisher validator participant 602 based on a private key for the furnisher validator participant 602. The furnisher validator participant 602 may have previously communicated a corresponding public key to a membership service provider, and/or some other source that is accessible to the receiver participant 508.

The furnisher participant 506 may generate a multi-signature certification message (912). For example, the furnisher participant 506 may determine that the furnisher validator participant 602, or a federation of furnisher validator participants, have provided corresponding certifications to export the token data.

In response to determination that all of the furnisher validator participants have certified the token data, the furnisher participant 506 may generate the multi-signature transfer message. The multi-signature certification message may include the digital signatures of one or more participant of the furnisher DLT network 502. In some examples, the multi-signature certification message may also include the token data to be shared or transferred. In other examples, the token data is communicated separately. The multi-signature certification message may reference or identify the token data to be transferred.

The furnisher participant 506 may communicate the multi-signature certification message to the receiver participant 508 (914). The receiver participant 508 may be external to the furnisher DLT network 502. For example, the receiver participant 508 may be a device that is not a full or partial node of the furnisher DLT network 502. Alternatively or in addition, the receiver participant 508 may include a participant of another blockchain. For example, the receiver participant 508 may be a participant of the receiver DLT network 504.

The furnisher participant 506 may share and/or export the token data to the receiver participant 508 (916). For example, the furnisher participant 506 may communicate the token data with the multi-signature transfer message. Alternatively or in addition, the furnisher participant 506 may communicate the token data separate from the multi-signature certification message. In other examples, the furnisher participant 506 may generate an instruction to access the token data from the furnisher blockchain. The instruction may cause the receiver participant 508 to communicate with the furnisher participant 506, or some other participant of the furnisher DLT network 502. For example, the receiver participant 508 may execute the instruction and communicate a request to receive the token data. The furnisher participant 506 may access, in response to receiving a request from the data receiver 110 based on the instruction, the token data from a plurality of datablocks included in the furnisher blockchain. The furnisher participant 506 may communicate the token data to the receiver participant 508.

In some examples, the furnisher participant 506 may receive a transfer token from the data receiver 110. The transfer token may be included to the receiver blockchain compliant with the receiver DLT network 504. The furnisher participant 506 may include the transfer token with the multi-signature certification message and/or the token data communicated to the receiver participant 508. The receiver participant 508 may determine, based on the transfer token, whether the transfer token has been previously spent before authorizing receipt of the token data from the furnisher DLT network 502. The receiver participant may prohibit and/or invalidate received from the furnisher DLT in response to existence of the transfer token on the receiver blockchain. Alternatively or in addition, the participants of the furnisher DLT network 502 may prohibit additional sharing and/or exporting of the token data in response to the transfer token existing on the furnisher blockchain.

Figure 10:
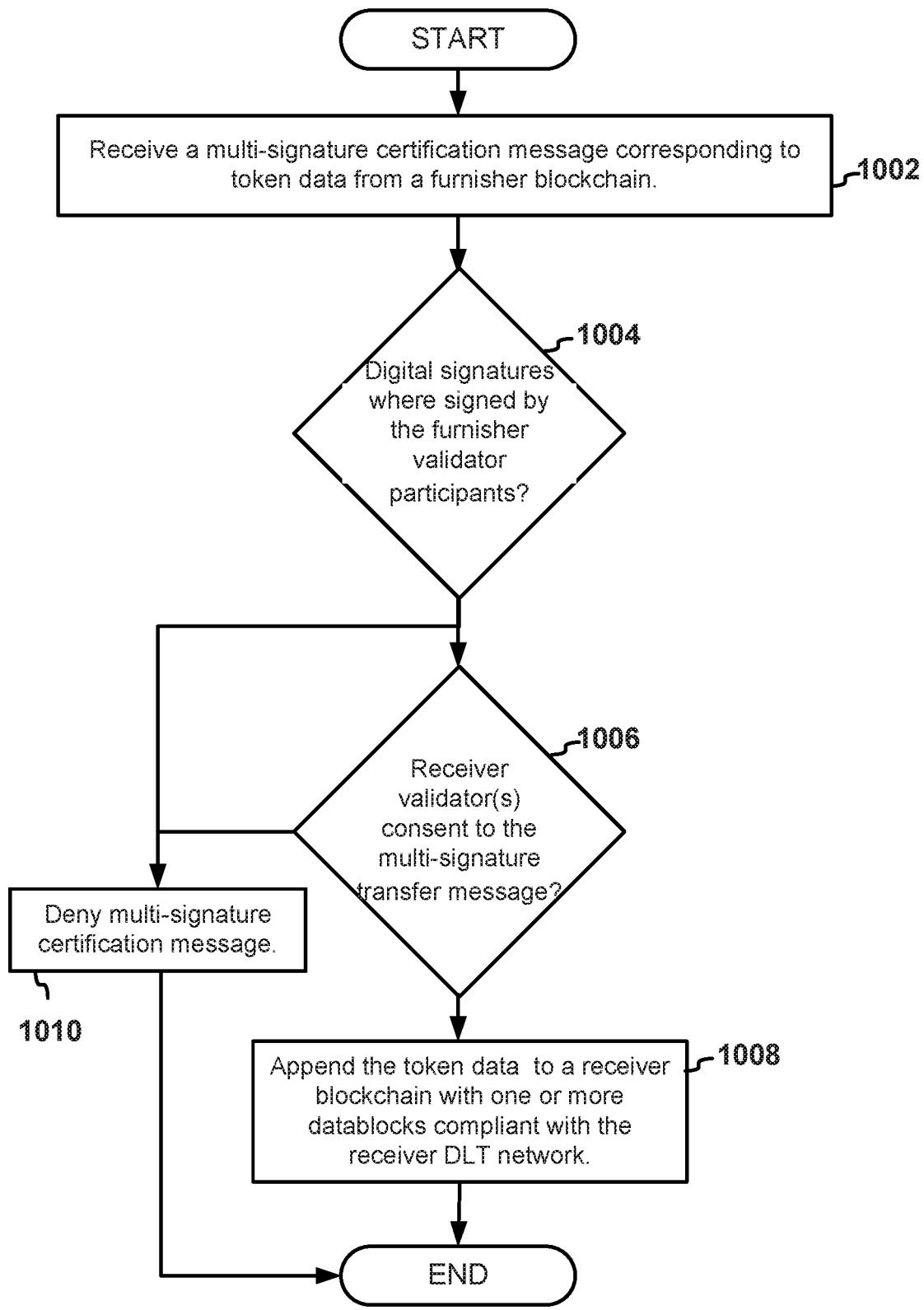
FIG. 10 illustrates a fifth example of a flow diagram for logic of an interoperable cryptologic blockchain system.

FIG. 10 illustrates a fifth example of a flow diagram for logic of the interoperable cryptologic blockchain system 100. The receiver participant 508 of the receiver DLT network 504 may receive a multi-signature certification message corresponding to token data from a furnisher blockchain (1002). The multi-signature certification message may include a certification of the token data stored on the furnisher blockchain. The certification may comprise a one or more digital signatures respectively generated by a federation of participants of the furnisher DLT network 502 and/or a multi-signature signed by each participant in the federation of participants.

The receiver participant 508 of the receiver DLT network 504 may determine whether the digital signatures where signed by one or more participants (1004) of the furnisher DLT network 502. In some examples, the receiver participant 508 may determine whether all of the furnisher validator participants, or a particular subset of all of the participants of the furnisher DLT network 502, signed a corresponding digital signature in the multi-signature certification message.

Depending on the implementation, determination of whether the digital signatures where signed by one or more furnisher validator participants may occur in a variety of manners. For example, the receiver participant 508 may access, from a MSP, public keys that correspond to the private keys created by the furnisher validators of the furnisher DLT network 502. In some examples, the multi-signature certification message may include identifiers of the participants of the furnisher DLT network 502. The receiver participant 508 may communicate identifiers of the furnisher validator participants to the MSP and the MSP may provide the public key(s) of the furnisher validator(s).

In another example, the receiver participant 508 may access a validation smart contract. The validation smart contract may be previously created and include the identifiers of participants of the furnisher DLT network 502 and/or the public keys of the one or more participants. In some examples, the validation smart contract may be stored on the receiver block chain or otherwise accessible to the receiver participant 508 and/or other participants of the receiver DLT network 504.

The receiver participant 508 of the receiver DLT network 504 may determine whether the receiver validator(s) consent to the multi-signature certification message (1006). For example, participants of the receiver DLT network 504 may have an interest in ensuring that the federation of participants of the furnisher DLT network 502 certify the token data. Alternatively or in addition, the participants of the receiver DLT network 504 may have an interest in ensuring that the token data a share or transfer of token data is authorized by one or more participants of the furnisher DLT network 502. In some examples, the receiver participant 508 of the receiver DLT network 504 may communicate a consensus request to one or more receiver validator participant of the receiver DLT network 504. The consensus request may include the at least one of the digital signatures created by the participants of the furnisher DLT network 502. The receiver validator 606 may verify that the digital signature(s) were signed by the participants of the furnisher DLT network 502. For example, the receiver validator 606 may access public keys from an MSP and determine, based on the public keys, that the digital signatures were signed by the participants of the furnisher DLT network 502. Alternatively or in addition, the receiver validator may access a smart contract comprising the public keys of the participants.

The receiver participant 508 may receive consensus verification message(s) created by the receiver validator participant(s). For example, the consensus verification message may include a verification that the at least one of the digital signatures was signed by at least one of the participants of the furnisher DLT network 502. Alternatively or in addition, the consensus verification message may include a verification that all of the digital signatures were signed by the furnisher validators of the furnisher DLT network 502. In some examples, the consensus verification message may include the identifiers and/or public keys of the participants of the furnisher DLT network 502 that signed the digital signatures. Alternatively or in addition, the consensus verification message may include a second digital signature signed by the receiver validator participant 606 based on a private key of the receiver validator participant 606.

In some examples, the consensus verification message may be communicated via a communication channel to the receiver participant 508. In other examples, the consensus verification message may be communicated via the receiver blockchain. For example, the receiver validator participant 606 may append, to the blockchain, one or more datablocks comprising the consensus verification message. The receiver participant 508 may detect that the consensus verification message was added to a local instance of the receiver blockchain.

In response to determination that the digital signatures were signed by the furnisher validator participants (1004, Yes), and/or in response to determination that the receiver validator participants 606 consent to the multi-signature certification message (1006, Yes), the receiver participant 508 may append the token data to a receiver blockchain with one or more datablocks compliant with the receiver DLT network 504 (1008). For example, the receiver participant 508 may append a datablock comprising the token data. The datablock may comprise a hash of a previous datablock of the receiver blockchain, or a portion thereof.

In response to determination that the digital signatures were not signed by the furnisher validator participants (1004, No), and/or in response to determination that the receiver validator participants 606 do not consent to the multi-signature certification message (1006, Yes), the receiver participant 508 may deny the multi-signature certification message (1010). For example, the receiver participant 508 may ignore or the token data and/or cancel a transaction involving the token data.

In many of the examples, of the system and methods of DLT interoperability described herein, communication occur between a "receiver" DLT network and a "furnisher" DLT network. The terms "receiver" and "furnisher" were used for clarity but are not intended to limit flow information between DLT networks or the number of DLT network in which interoperability occurs. For example, participants of the furnisher DLT network 502 may receive information from the receiver DLT network 504 and participants of the receiver DLT network 504 may furnish information to the furnisher DLT network 502.

Figure 11:
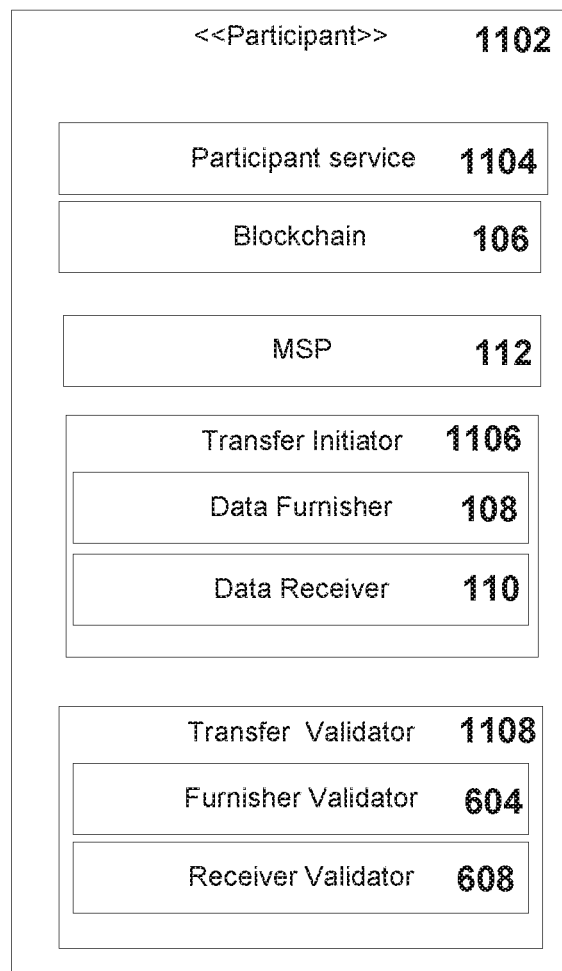
FIG. 11 illustrates an example of an interoperable participant of a distributed ledger technology network.

FIG. 11 illustrates an example of an interoperable participant 1102 of for the DLT network 104. The interoperable participant 1102 may a participation service 1104 that causes the interoperable participant to be a full or partial node of the DLT network 104. The DLT network 104 may include, for example, the furnisher DLT network 502, the receiver DLT network 504, or some other DLT network (see FIG. 5). The participant layer may access, modify, append, or otherwise interact with the blockchain and other participants of the DLT network 104 in a manner that is compliant with the protocols of the DLT network 104.

In some examples, the interoperability participant 1102 may include a transfer initiator 1106. The transfer initiator 1106 may coordinate sending and receiving data between blockchains as described herein. For example, the transfer initiator 1106 may include the data furnisher 108 and/or the data receiver 110.

In some examples, the interoperability participant 1102 may include a transfer validator 1108. The transfer validator 1108 may validate token data being exchanged between DLT networks. Depending on whether the DLT network 104 is send or receiving token data, the transfer validator may validate differently. For example, the transfer validator 1108 may include the furnisher validator 604 and may corroborate with other participants of the DLT network 104 to certify the token data is stored on the blockchain and/or that the token data is locked. For example, the furnisher validator 604 may reach consensus with a plurality of other participants of the DLT network 104 that token data is stored on the furnisher blockchain and includes correct information. Alternatively or in addition, the transfer validator 1108 may include the receiver validator 608. The receiver validator 608 may, as described herein, certify and/or validate data being imported or shared with the DLT network 104. For example, the receiver validator 608 may reach consensus with other participants of the DLT network 104 that information may be imported or shared with the DLT network 104. Alternatively or in addition, the receiver validator 608 may verify the signatures provided by the participants of the DLT network 104 and/or other DLT networks that interoperate with the DLT network 104.

Depending in on the implementation, the interoperable participant 1102 may have one or more of the participant service 1104, the blockchain 106, the MSP 112, the transfer initiator 1106, and/or transfer validator 1108. In examples, where the interoperable participant 1102 has the MSP 112, the interoperable participant 1102 may be a node of multiple DLT networks and/or may be accessible to multiple DLT networks.

Figure 12:
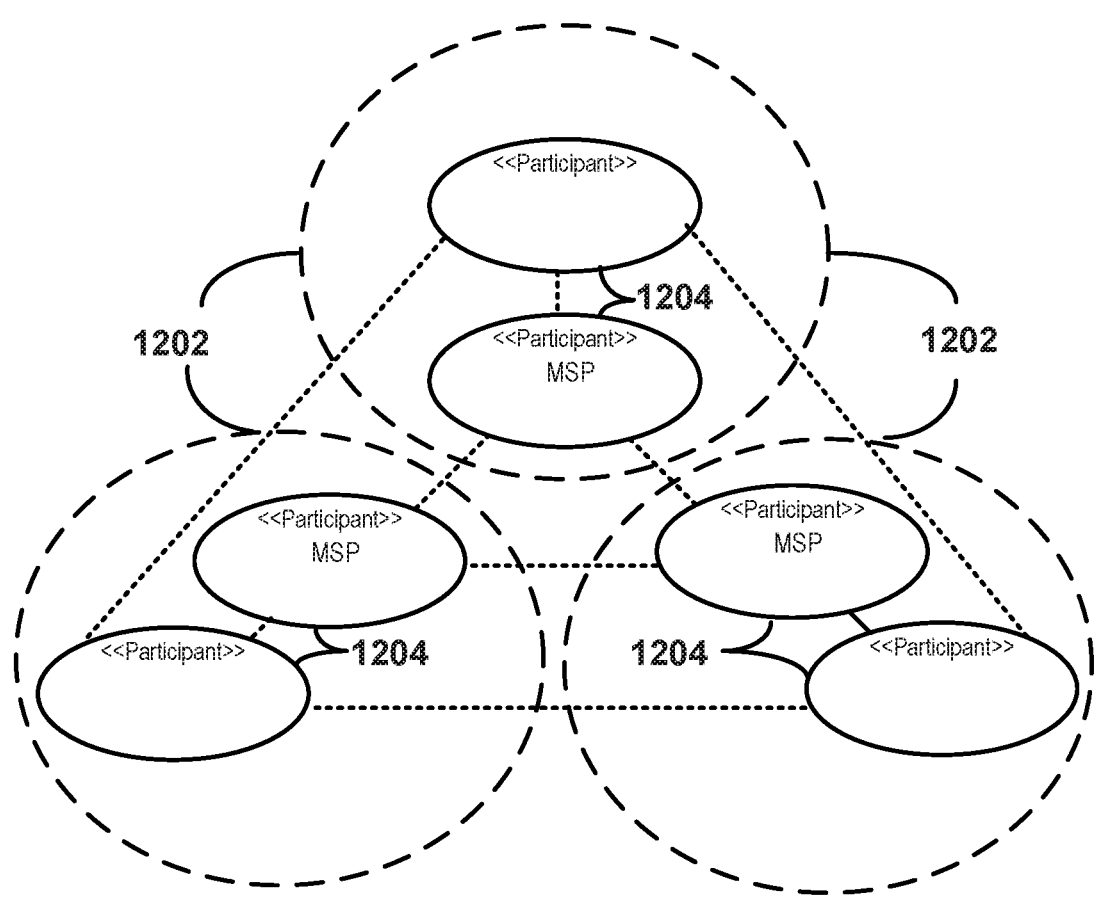
FIG. 12 illustrates an example of an interoperable cryptologic blockchain with multiple distributed ledger technology networks.

FIG. 12 illustrates an example of an interoperable cryptologic blockchain with multiple DLT networks 1202. Each of the DLT networks may include multiple interoperable participants 1204. In some examples, each of the DLT networks 1202 may include a corresponding interoperability participant with an MSP that exchanges public keys and identify information with an MSP configured in another DLT network. Alternatively or in addition, each of the DLT networks 1202 may include interoperable participants 1204 that include respective transfer initiators and/or transfer validators. While the sample illustrated in FIG. 3 shows three interoperable DLT networks, in other examples, greater or fewer DLT networks may coordinate the sharing and transferring of token data between the DLT networks, as described herein.

The logic illustrated in the flow diagrams may include additional, different, or fewer operations than illustrated. The operations illustrated may be performed in an order different than illustrated. The system 100, the interoperable participant 1102, and/or the DLT network 104 may be implemented with additional, different, or fewer components than illustrated. Each component may include additional, different, or fewer components.

Figure 13:
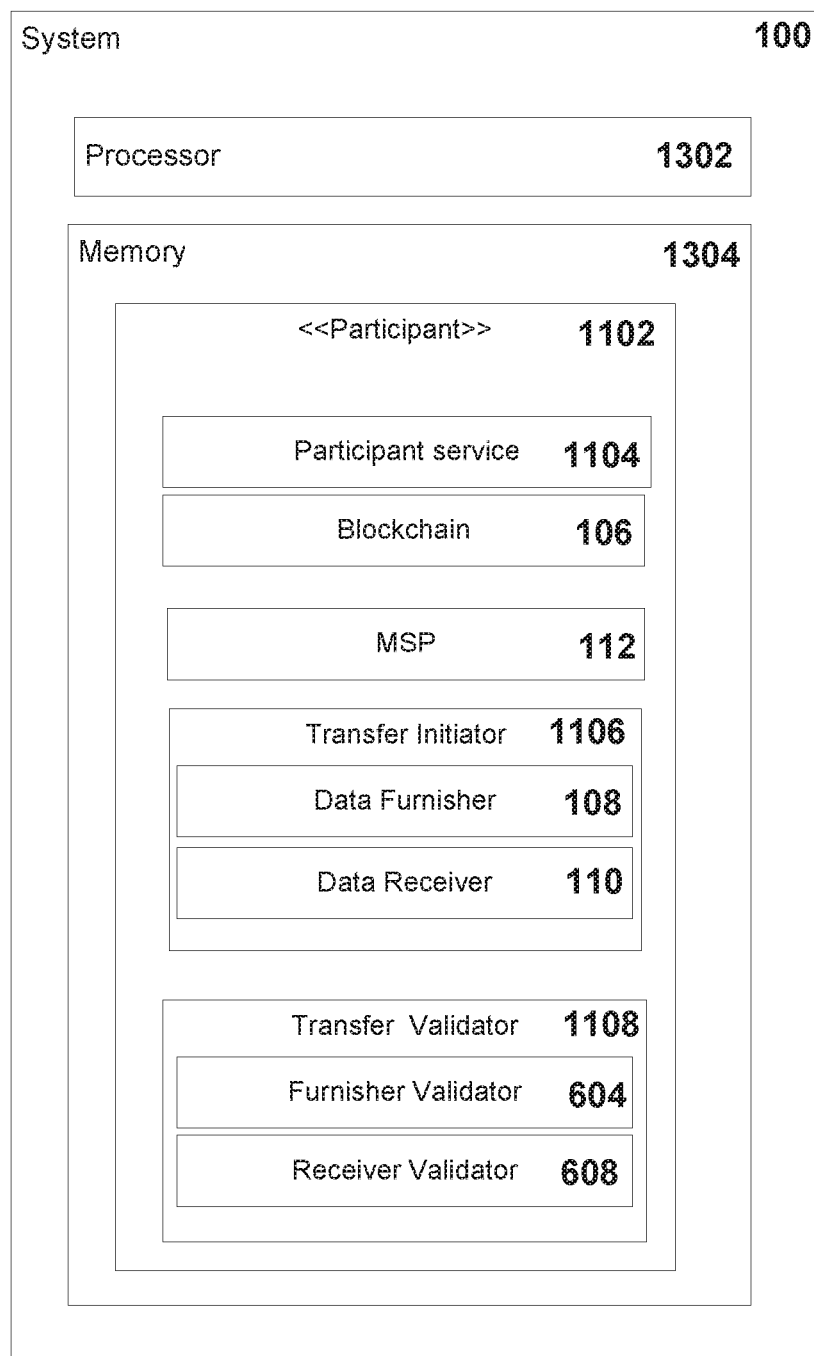
FIG. 13 illustrates an example of an interoperable cryptologic blockchain system that includes a memory and a processor.

FIG. 13 illustrates an example of the system 100 that includes a processor 1302 and a memory 1304. The processor 1302 may be in communication with the memory 1304. In one example, the processor 1302 may also be in communication with additional elements, such as a network interface (not shown). Examples of the processor 1302 may include a general processor, a central processing unit, a microcontroller, a server, an application specific integrated circuit (ASIC), a digital signal processor, a field programmable gate array (FPGA), and/or a digital circuit, analog circuit, or some combination thereof.

The processor 1302 may be one or more devices operable to execute logic. The logic may include computer executable instructions or computer code stored in the memory 1304 or in other memory that when executed by the processor 1302, cause the processor 1302 to perform the features implemented by the logic of the interoperable participant 1102, the participant service 1104, the blockchain 106, the MSP 112, the transfer initiator 1106, the data furnisher 108, the data receiver 110, the transfer validator 1108, the furnisher validator 604, the receiver validator 608 and/or the system 100. The computer code may include instructions executable with the processor 1302.

The memory 1304 may be any device for storing and retrieving data or any combination thereof. The memory 1304 may include non-volatile and/or volatile memory, such as a random access memory (RAM), a read-only memory (ROM), an erasable programmable read-only memory (EPROM), or flash memory. Alternatively or in addition, the memory 1304 may include an optical, magnetic (hard-drive) or any other form of data storage device.

The memory 1304 may include at least one the interoperable participant 1102, the participant service 1104, the blockchain 106, the MSP 112, the transfer initiator 1106, the data furnisher 108, the data receiver 110, the transfer validator 1108, the furnisher validator 604, the receiver validator 608 and/or the system 100. In addition, the memory may include any other component previously discussed, such as, the membership service repository 114 and/or other components of the system 100 described herein.

The system 100 may be implemented in many different ways. For example each component of the system may include a logical component or logical components. Each logical component or logical components may be hardware or a combination of hardware and software. The logical component(s) may include the interoperable participant 1102, the participant service 1104, the blockchain 106, the MSP 112, the transfer initiator 1106, the data furnisher 108, the data receiver 110, the transfer validator 1108, the furnisher validator 604, the receiver validator 608, and/or other components and subcomponents of the system 100 described herein. For example, each logical component(s) may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each logical component may include memory hardware, such as a portion of the memory 1304, for example, that comprises instructions executable with the processor 1302 or other processor to implement one or more of the features of the logical component(s). When any one of the logical components includes the portion of the memory that comprises instructions executable with the processor 1302, the logical component may or may not include the processor 1302. In some examples, each logical component may just be the portion of the memory 1304 or other physical memory that comprises instructions executable with the processor 1302 or other processor to implement the features of the corresponding logical component without the logical component including any other hardware. Because each logical component includes at least some hardware even when the included hardware comprises software, each logical component may be interchangeably referred to as a hardware circuitry.

Some features are shown stored in a computer readable storage medium (for example, as logic implemented as computer executable instructions or as data structures in memory). All or part of the system 100 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memory(s), all or part of the system 100 or systems may be stored on, distributed across, or read from other computer readable storage media, for example, secondary storage devices such as hard disks, flash memory drives, floppy disks, and CD-ROMs. Moreover, the various modules, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

In various examples, the systems and methods described herein may relate to the following aspects:

1. A method or system for blockchain interoperability comprising:
   receiving, by a furnisher participant of a furnisher DLT network, a request to export token data stored on a furnisher blockchain that stores the token data based on a furnisher DLT;
   transmitting, to a plurality of validator participants of the furnisher DLT network, a consensus request to certify the token data is stored on a furnisher blockchain, the consensus request indicative of the token data stored in the furnisher blockchain;
   receiving certifications of the token data respectively created by the validator participants, the certifications including digital signatures respectively signed by the validator participants based on private keys for the validator participants, the certifications indicative of the token data being stored on the furnisher blockchain;
   generating, in response to receipt of the certifications, a multi-signature certification message, the multi-signature certification message comprising the digital signatures; and
   communicating the multi-signature certification message to a data receiver, the data receiver configured to verify the digital signatures based on public keys that are paired with the respective private keys.

2. The method of aspect 1, further comprising:
   providing the public keys of the validator participants to a membership service provider that associates the public keys with corresponding identifiers of the validator participants, wherein the data receiver is configured to access to the membership service provider to verify the digital signatures.

3. The method of any of aspects 1 to 2, wherein the data receiver comprises a receiver participant of a receiver DLT network, wherein the receiver DLT network is based on a different DLT than the furnisher DLT network.

4. The method of any of aspects 1 to 3, wherein the data receiver comprises a receiver participant of a receiver DLT network, the method further comprising:
   receiving a transfer token from the receiver participant; and
   including the transfer token in the multi-signature certification message.

5. The method of any of aspects 1 to 4, further comprising:
   locking the token data on the furnisher blockchain; and
   exporting the token data to the data receiver,
   wherein the certifications of the token data are further indicative of the token data being locked on the furnisher blockchain.

6. The method of any of aspects 1 to 5, wherein locking the token data further comprises:
   prohibiting an additional datablock from being added to the furnisher blockchain in response to the token data being locked and the additional datablock comprising update information corresponding to the token data.

7. The method of any of aspects 1 to 6, further comprising:
   generating an instruction to access the token data from the furnisher blockchain, the instruction configured to cause the data receiver to access the token data from the furnisher participant;
   communicating the instruction to the data receiver;
   accessing, in response to receiving a request from the data receiver based on the instruction, the token data from a plurality of datablocks included in the furnisher blockchain; and
   communicating the token data to the data receiver.

8. The method of any of aspects 1 to 7, wherein communicating the consensus request to the validator participants further comprises:
   communicating the consensus request to the validator participants via a communication channel between the furnisher participant and at least one of the validator participants.

9. The method of any of aspects 1 to 8, wherein communicating the consensus request to the validator participant further comprises:
   appending a datablock on the furnisher blockchain, the datablock comprising the consensus request and a hash of a previous datablock on the furnisher blockchain, wherein the validator participant is configured to identify the datablock in an instance of the furnisher blockchain accessible to the validator participant.

10. The method of any of aspects 1 to 9, further comprising:
    receiving a second multi-signature certification request comprising an certification that additional token data is stored on a receiver blockchain based on a receiver DLT, the certification comprising a plurality of digital signatures respectively generated by receiver validation participants of the receiver DLT network;
    verifying that the digital signatures where signed by all of the receiver validation participants of the receiver DLT network; and
    appending, to the furnisher blockchain, in response verification that the digital signatures where signed by all of the receiver validation participants of the receiver DLT network, a datablock comprising the addition token data.

11. A method comprising:
　　receiving, by a participant of a receiver distributed ledger technology (DLT) network, a multi-signature certification message comprising digital signatures respectively signed by validator participants of a furnisher DLT network based on private keys for the validator participants, the digital signatures indicative of certifications that the token data is locked on a furnisher blockchain;
　　verify that the digital signatures where signed by the validator participants of the furnisher DLT network by:
　　　　accessing a plurality of public keys that correspond to the private keys for the validator participants of the furnisher DLT network; and
　　　　verifying that each of the validator participants of the furnisher DLT network respectively signed digital signatures based on the public keys;
　　appending, to a receiver blockchain based on a receiver DLT, in response to determination that the digital signatures were signed by the validator participants of the furnisher DLT network, a datablock comprising the token data.

12. The method of aspect 11, wherein accessing the plurality of public keys that correspond to the private keys further comprises:
　　requesting, based on identifiers of the validator participants of the furnisher DLT network, the public keys from a membership service provider configured to store associations between the public keys and the identifiers.

13. The method of any of aspects 11 to 12, further comprising:
　　determining that a second participant of the receiver DLT network consents to the multi-signature certification message by:
　　　　communicating a consensus request to the second participant of the receiver DLT network, the consensus request comprising the at least one of the digital signatures created by the participants of the furnisher DLT network,
　　　　receiving a consensus verification message created by the second participant, the consensus verification message comprising a verification that the at least one of the digital signatures was signed by the at least one of the participants of the furnisher DLT network.

14. The method of aspect 13, wherein the second participant comprises a plurality of participants of the receiver DLT network.

15. The method of aspect 13, wherein receiving the consensus verification message further comprises:
　　receiving the consensus verification message from the second participant via a communication channel separate from the receiver blockchain.

16. The method of aspect 13, wherein receiving the consensus verification message further comprises:
　　obtaining the consensus verification message from a datablock stored on the receiver blockchain.

17. The method of any of aspects 11 to 16, wherein determining that the digital signatures where signed by the participants of the furnisher DLT network further comprises:
　　accessing a smart contract comprising a plurality of public keys that correspond to the private keys created by the participants of the furnisher DLT network, the smart contract further comprising self-executing logic configured to verify the digital signatures included in the multi-signature certification message; and
　　verifying, by execution of the self-executing logic, that the participants of the furnisher DLT network signed the multi-signature certification message.

18. The method of any of aspects 11 to 17, further comprising:
　　extracting the smart contract from a datablock included in the receiver blockchain; and
　　determining that all of the participants of the furnisher DLT network identified in the smart contract authorize receipt of the token data by the furnisher DLT network.

19. The method of any of aspects 11 to 18, wherein further comprising:
　　exchanging, with at least one of the participants of the furnisher DLT network, the plurality of public keys and identifiers of the participants;
　　storing the public keys in a membership service repository configured on the participant of the receiver DLT network.

20. The method of any of aspects 11 to 19, wherein further comprising:
　　providing the public keys of the participants of the furnisher DLT network to other participants of the receiver DLT network.

21. A system comprising:
　　a processor, the processor configured to
　　　　send, to a data receiver, a participant public key for a participant of a distributed ledger technology (DLT) network, the data receiver not included in the DLT network;
　　　　receive, from the data receiver, a request to share token data stored in a blockchain that is based on a DLT;
　　　　generate a certification that the token data is stored on the blockchain, the certification comprising a digital signature based on a participant private key paired to the participant public key; and
　　　　transmit the certification to the data receiver, the data receiver configured to verify the certification based on the participant public key.

22. The system of aspect 21, wherein to transmit the certification to the data receiver, the processor is further configured to
　　communicate, to the data receiver, the token data, the token data encrypted based on the participant private key.

23. The system of any of aspects 21 to 22, wherein the processor is further configured to generate the digital signature, the digital signature encrypted with a private key that is paired with the participant public key provided to the data receiver.

24. The system of any of aspects 21 to 23, wherein processor is further configured to:
　　transmit the token data to the data receiver;
　　append, to the blockchain, a transfer token that indicates the token data was exported to the data receiver; and
　　restrict, the token data from being exported again in response to existence of the transfer token in the blockchain.

25. The system of any of aspects 21 to 24, wherein the processor is further configured to:
　　receive, from the data receiver, a key request, the key request comprising an identifier of the data receiver and an identifier of the participant of the DLT network; and
　　determine, based on a share permission, that the data receiver is authorized to receive the participant public key,
　　wherein the participant public key is sent to the data receiver in response to receipt of the key request and determination that the data receiver is authorized to receive the participant public key.

26. The system of any of aspects 21 to 25, wherein the processor is further configured to:
　　receive, from the data receiver, a public key for the data receiver, the public key corresponding to a private key stored by the data receiver; and include, in the certification, the public key for the data receiver.

27. The system of any of aspects 21 to 26, further wherein the processor is further configured to:
lock the token data stored in the blockchain by appending a second datablock to the blockchain, the second datablock comprising an identifier of the token data.

28. The system of aspect 27, wherein the processor is further configured to:
receive a request to update the token data stored in the blockchain; and
deny, in response to the token data being locked, the request to update the token data.

29. The system of any of aspects 21 to 28, wherein to generate a certification that the token data is stored on the blockchain, the processor is further configured to:
obtain respective digital signatures from federated participants, the federated participants comprising only a subset of participants of the DLT network; and
include, in the certification, the respective digital signatures.

30. The system of any of aspects 21 to 28, wherein to obtain respective digital signatures from a federation of participants, the processor is further configured to:
communicate a request for the digital signature to each of the federated participants; and
receive the digital signature from each of the federated participants.

What is claimed is:

1. A system comprising:
a processor circuitry, configured to:
send, to a data receiver, a participant public key for a participant node of a distributed ledger technology (DLT) network, the DLT network comprising a plurality of participant nodes, wherein the participant nodes respectively validate a distributed ledger based on a consensus protocol, the data receiver not included in the DLT network;
receive, from the data receiver, a request to share token data stored in a blockchain of the distributed ledger;
generate a certification that the token data is stored on the blockchain, the certification comprising a plurality of digital signatures or a multi-signature of multiple of the participant nodes of the DLT network based on a participant private key paired to the participant public key; and
transmit the certification to the data receiver, the data receiver configured to verify the certification based on the participant public key.

2. The system of claim 1, wherein to transmit the certification to the data receiver, the processor circuitry is further configured to communicate, to the data receiver, the token data, the token data encrypted based on the participant private key.

3. The system of claim 1, wherein the processor circuitry is further configured to generate the plurality of digital signatures or the multi-signature, encrypted with the participant private key that is paired with the participant public key provided to the data receiver for each of the respective digital signatures or the multi-signature.

4. The system of claim 1, wherein processor circuitry is further configured to:
transmit the token data to the data receiver;
append, to the blockchain, a transfer token that indicates the token data was exported to the data receiver; and
restrict, the token data from being exported again in response to existence of the transfer token in the blockchain.

5. The system of claim 1, wherein the processor circuitry is further configured to:
receive, from the data receiver, a key request, the key request comprising an identifier of the data receiver and an identifier of the participant node of the DLT network; and
determine, based on a share permission, that the data receiver is authorized to receive the participant public key, wherein the participant public key is sent to the data receiver in response to receipt of the key request and determination that the data receiver is authorized to receive the participant public key.

6. The system of claim 1, wherein the processor circuitry is further configured to:
receive, from the data receiver, a public key for the data receiver, the public key corresponding to a private key stored by the data receiver; and
include, in the certification, the public key for the data receiver.

7. The system of claim 1, further wherein the processor circuitry is further configured to:
lock the token data stored in the blockchain by appending a second datablock to the blockchain, the second datablock comprising an identifier of the token data.

8. The system of claim 7, wherein the processor circuitry is further configured to:
receive a request to update the token data stored in the blockchain; and
deny, in response to the token data being locked, the request to update the token data.

9. The system of claim 1, wherein to generate a certification that the token data is stored on the blockchain, the processor circuitry is further configured to:
obtain respective digital signatures from federated participant nodes, the federated participant nodes comprising only a subset of participant nodes of the DLT network; and
include, in the certification, as the plurality of digital signatures or the multi-signature, the respective digital signatures.

10. The system of claim 9, wherein to obtain respective digital signatures from a federation of participant nodes, the processor circuitry is further configured to:
communicate a request for a digital signature to each of the federated participant nodes; and
receive a respective digital signature from each of the federated participant nodes.

11. A method, comprising:
sending, to a data receiver, a participant public key for a participant node of a distributed ledger technology (DLT) network, the DLT network comprising a plurality of participant nodes, wherein the participant nodes respectively validate a distributed ledger based on a consensus protocol, the data receiver not included in the DLT network;
receiving, from the data receiver, a request to share token data stored in a blockchain of the distributed ledger;
generating a certification that the token data is stored on the blockchain, the certification comprising a plurality of digital signatures or a multi-signature of multiple of the participant nodes of the DLT network based on a participant private key paired to the participant public key; and transmitting the certification to the data receiver, the data receiver configured to verify the certification based on the participant public key.

12. The method of claim 11, wherein to transmitting the certification to the data receiver further comprises:
communicating, to the data receiver, the token data, the token data encrypted based on the participant private key.

13. The method of claim 11, further comprising:
generating the digital signatures or the multi-signature, the digital signatures or the multi-signature encrypted with a private key that is paired with the participant public key provided to the data receiver.

14. The method of claim 11, further comprising:
transmitting the token data to the data receiver;
appending, to the blockchain, a transfer token that indicates the token data was exported to the data receiver; and
restricting, the token data from being exported again in response to existence of the transfer token in the blockchain.

15. The method of claim 11, further comprising:
receiving, from the data receiver, a key request, the key request comprising an identifier of the data receiver and an identifier of the participant node of the DLT network; and
determining, based on a share permission, that the data receiver is authorized to receive the participant public key,
wherein the participant public key is sent to the data receiver in response to receipt of the key request and determination that the data receiver is authorized to receive the participant public key.

16. The method of claim 11, further comprising:
receiving, from the data receiver, a public key for the data receiver, the public key corresponding to a private key stored by the data receiver; and
including, in the certification, the public key for the data receiver.

17. The method of claim 11, further comprising:
locking the token data stored in the blockchain by appending a second datablock to the blockchain, the second datablock comprising an identifier of the token data.

18. The method of claim 17, further comprising:
receiving a request to update the token data stored in the blockchain; and
denying, in response to the token data being locked, the request to update the token data.

19. The method of claim 11, wherein to generating a certification that the token data is stored on the blockchain further comprises:
receiving respective digital signatures from federated participant nodes, the federated participant nodes comprising only a subset of participant nodes of the DLT network; and
including, in the certification, as the plurality of digital signatures or the multi-signature, the respective digital signatures.

20. A non-transitory computer readable storage medium, comprising:
a plurality of instructions, the instructions executed by a processor to:
send, to a data receiver, a participant public key for a participant node of a distributed ledger technology (DLT) network, the DLT network comprising a plurality of participant nodes, wherein the participant nodes respectively validate a distributed ledger based on a consensus protocol, the data receiver not included in the DLT network;
receive, from the data receiver, a request to share token data stored in a blockchain of the distributed ledger;
generate a certification that the token data is stored on the blockchain, the certification comprising a plurality of digital signatures or a multi-signature of multiple of the participant nodes of the DLT network based on a participant private key paired to the participant public key; and
transmit the certification to the data receiver, the data receiver configured to verify the certification based on the participant public key.

* * * * *